United States Patent

Tixier

[15] 3,638,484
[45] Feb. 1, 1972

[54] METHODS OF PROCESSING WELL LOGGING DATA

[72] Inventor: Maurice P. Tixier, Houston, Tex.
[73] Assignee: Schlumberger Technology Corporation, New York, N.Y.
[22] Filed: Nov. 5, 1968
[21] Appl. No.: 773,592

[52] U.S. Cl. ..................73/152, 181/0.5 BE, 250/83.6 W, 324/5, 340/18 DC
[51] Int. Cl. ..................................................E21b 47/08
[58] Field of Search ..................73/152; 250/83.6 W; 324/5, 324/6, 10, 1; 166/250

[56] References Cited

UNITED STATES PATENTS

| | | | |
|---|---|---|---|
| 3,180,141 | 4/1965 | Alger | 321/1 X |
| 3,211,909 | 10/1965 | Owen | 250/83.6 W UX |
| 3,435,217 | 3/1969 | Givens | 250/83.6 W X |

OTHER PUBLICATIONS

Burke, J. A. et al. Computer Processing of Log Data Improves Production in Chaveroo Field. From Journal of Petroleum Technology, July 1967 Vol. 19, pp. 889– 895. TN860J6
Tinch; D. H. et al. Application of Magnetic Tapes to Well Logging. From Journal of Petroleum Technology. June 1966, Vol. 18, pp. 687– 696. TN860J6

*Primary Examiner*—Jerry W. Myracle
*Attorney*—Donald H. Fidler, Edward M. Roney, William R. Sherman, William J. Beard, Stewart F. Moore, Jerry M. Presson and Leonard R. Fellen

[57] ABSTRACT

In accordance with illustrative embodiments of the present invention, techniques for determining certain formation characteristics in shaly sands are disclosed. In one embodiment, porosity data derived from sonic, neutron and formation density logging tools are combined with noninvaded zone resistivity data and various "assumed value" parameters to produce computed indications of shale or clay content, total and effective, nonclay filled porosity, hydrocarbon and water saturation, and formation pressure. In other embodiments, porosity data from only two of the three porosity tools can be combined with resistivity data and "assumed value" parameters to produce the computed indications. In all embodiments, the computed indications are tested for feasibility, and if not feasible, certain ones of the "assumed value" parameters are adjusted to make the computed indication feasible. Additionally, spontaneous potential, natural gamma ray, and borehole diameter data may be used to inhibit the computations under certain borehole and formation conditions.

44 Claims, 14 Drawing Figures

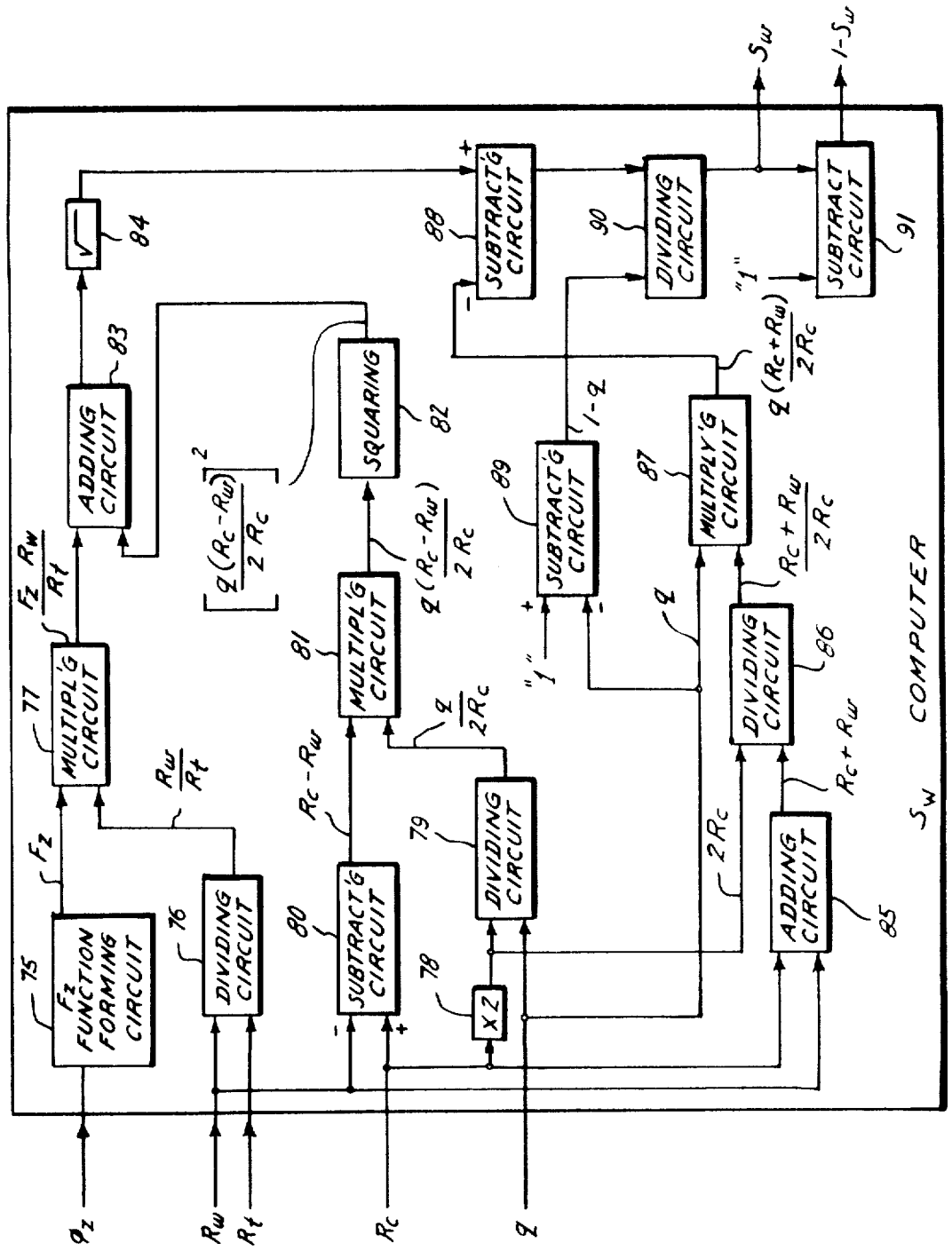

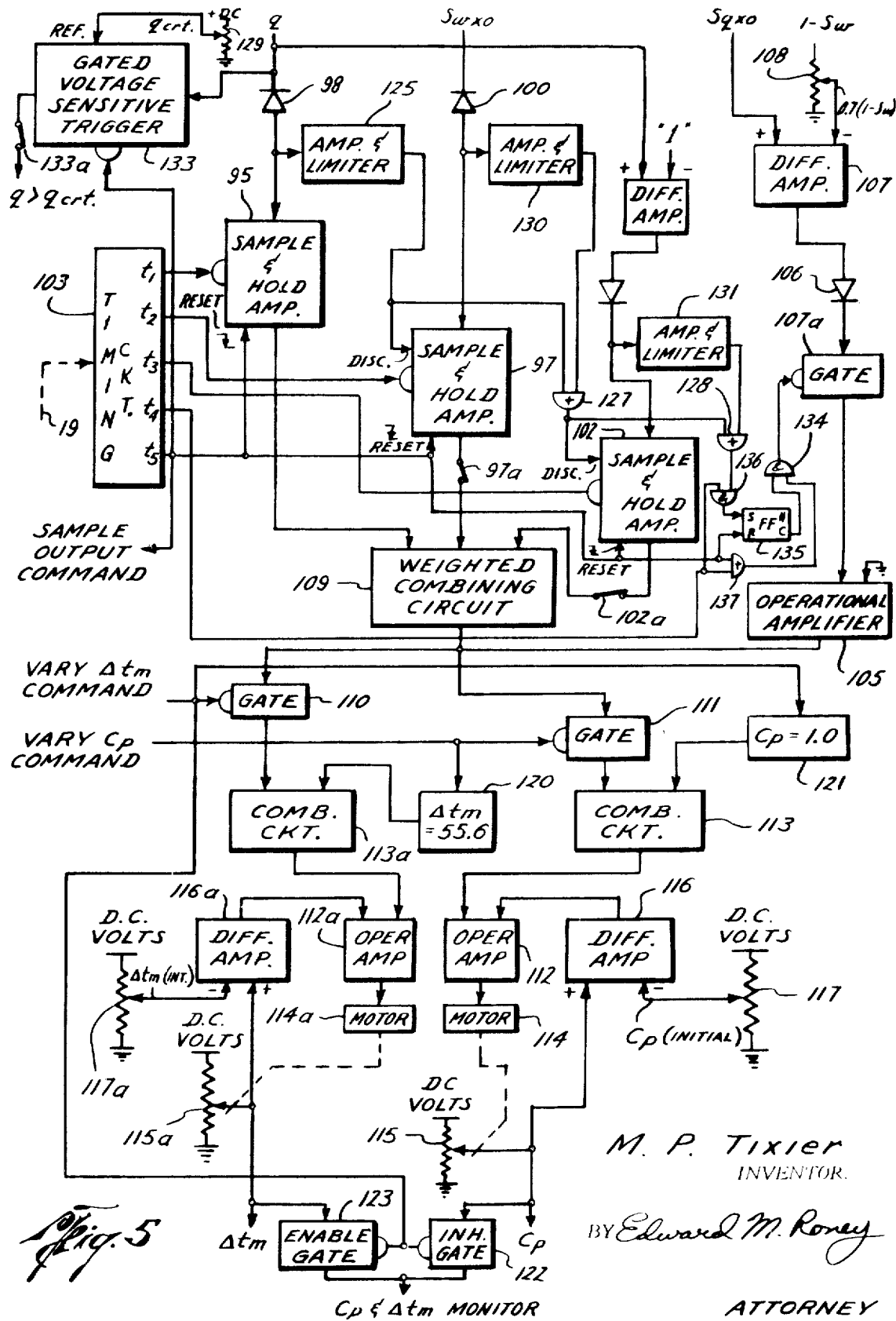

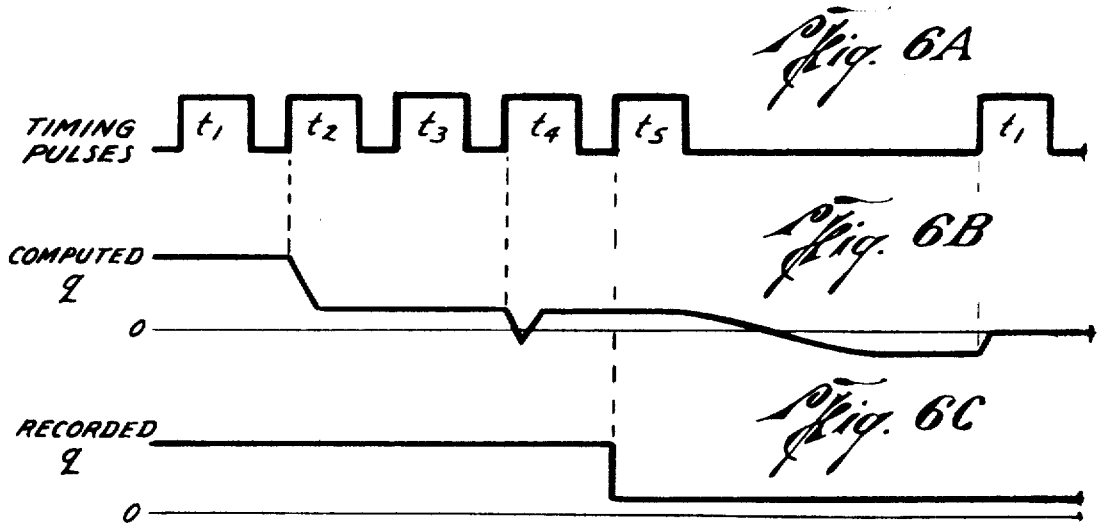
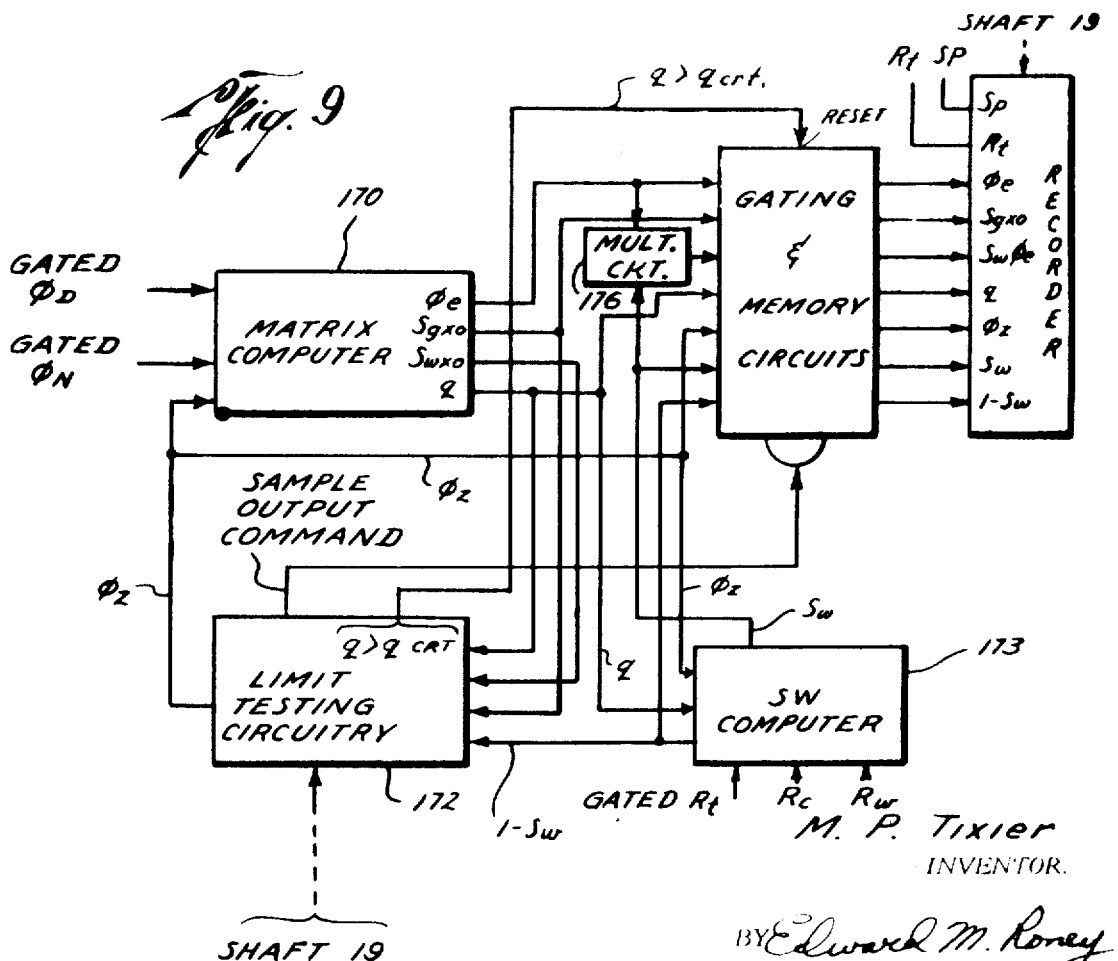

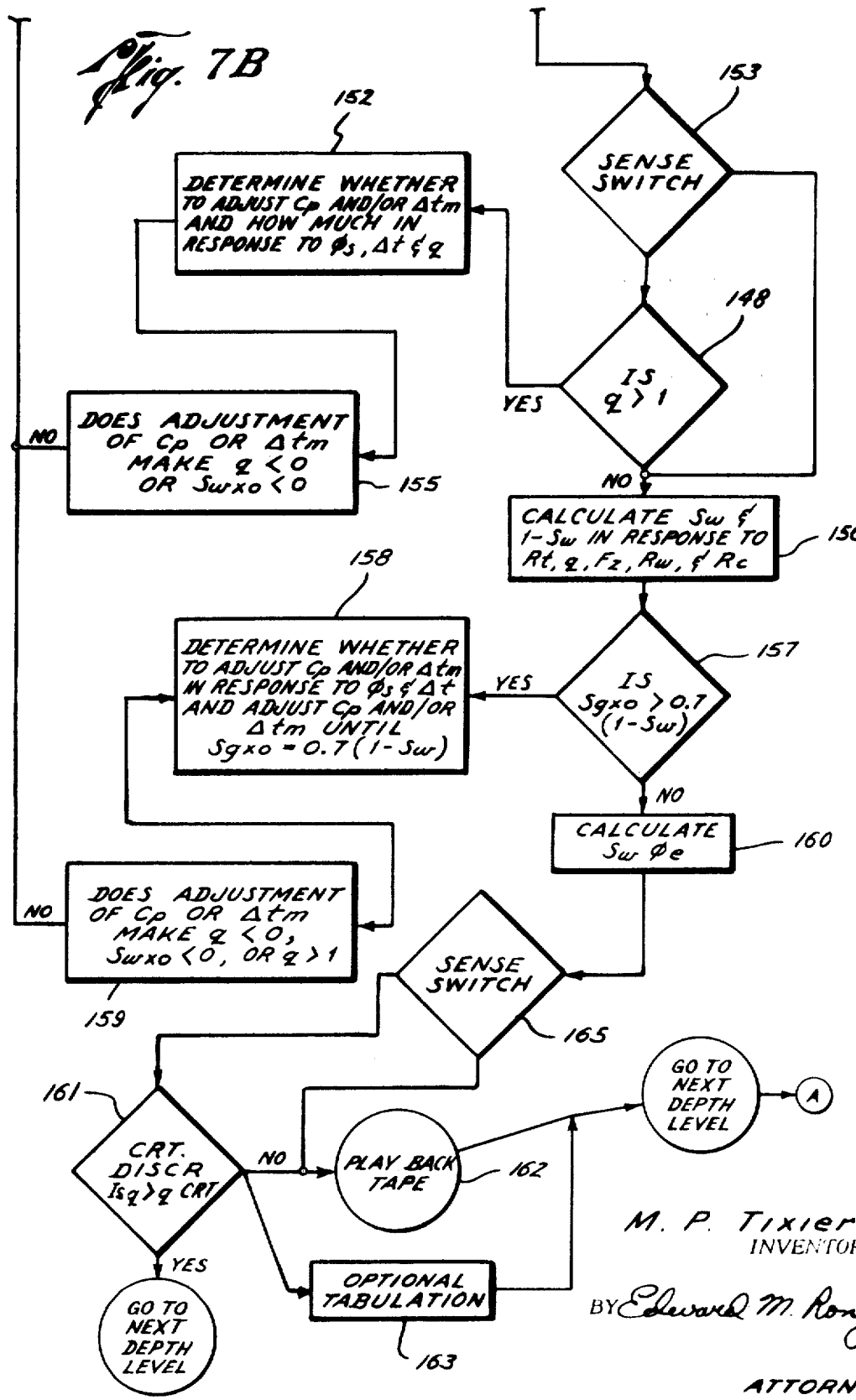

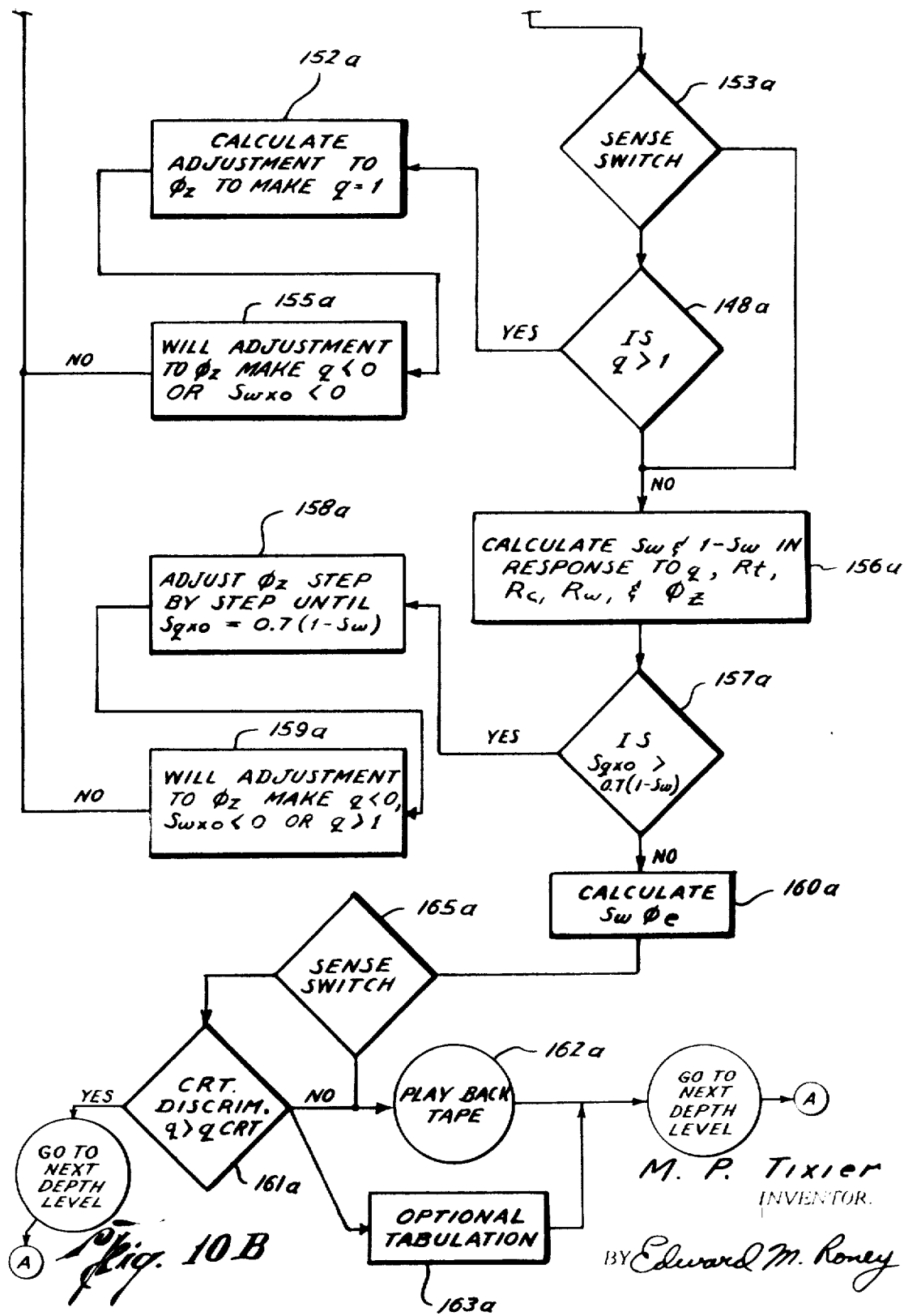

METHODS OF PROCESSING WELL LOGGING DATA

This invention relates to methods of investigating earth formations traversed by a borehole. More particularly, the invention relates to the processing of well logging data derived from apparatus lowered in a borehole for investigating subsurface earth formations.

In seeking to determine the presence and depth of hydrocarbon bearing zones (oil or gas) that may exist in the subsurface earth formations adjacent a borehole drilled into the earth, various types of exploring devices may be lowered into the borehole for measuring various properties of the formation adjacent the borehole. The three principal types of such exploring devices are electrical exploring devices (using either electrodes or induction coils), sonic exploring devices, and radioactivity exploring devices (gamma ray, neutron, etc.).

The electrical exploring devices measure the electrical resistivities (or conductivities) of the earth formations. These electrical resistivities are determined primarily by the amount, distribution and resistivity of the fluids contained in the formation pore spaces. The sonic exploring devices, on the other hand, measure the time required for sonic waves to travel across a given span of the earth formation. This sonic travel time is determined primarily by the nature of the rock structure and particularly its porosity. The radioactivity exploring devices measure either the natural radioactivity of the formations or the radioactivity induced therein by bombardment of the formations with radioactivity particles or rays.

Two particular radioactivity exploring devices used to investigate formations are the formation density logging tool and the neutron logging tool. The formation density logging tool emits gamma rays which are diffused through the formation and the number of diffused gamma rays reaching one or more nearby detectors are counted to provide a measure of the electron density of the adjacent formation. Moreover, it is known that this electron density is very closely proportional to the bulk density of the formation in substantially all cases. (For cases where this proportionality does not apply, appropriate corrections can be made.)

The neutron tool on the other hand utilizes a source for emitting neutrons into the adjacent formations. In one form of neutron device, these neutrons lose energy by collision with atoms in the formation. When the energy level of these neutrons is reduced to the epithermal energy range, they can be detected by a nearby detector which counts the number of epithermal neutrons. Since hydrogen atoms are the only ones whose weights are almost equal to that of the neutron, they are the most effective in reducing the energy level of the neutrons to enable their capture. Thus, it can be said that this type of neutron log is essentially a record of the hydrogen atom density of the rocks surrounding the borehole. Since the formation pore spaces are generally filled with either water or liquid hydrocarbons which both have about the same amount of hydrogen, the neutron log does not distinguish between oil and water, but is primarily affected by the formation porosity. Gas, on the other hand, will alter this porosity determination by the neutron log.

In general, none of these measurements taken alone give a direct and positive indication as to the presence or amount of hydrocarbons in the formations or the relative difficulty in removing these hydrocarbons. The various factors which affect each measurement have to be taken into account and an interpretation or deduction made as to the probable existence of hydrocarbons. Among the factors which are considered to be important in determining the location, amount, and ease of removal of oil is the porosity of the formations. Porosity is the fraction of the total volume of a given portion of the formation which is occupied by pores, or void spaces. Another such factor is the makeup of the solid formation material, i.e., limestone, sandstone, etc.

It is known that by combining the measurements derived from the formation density log, the sonic log, and the neutron log, measurements of the porosity and lithology of the formation can be obtained. (For example, see copending application, Ser. No. 672,267 filed on Oct. 2, 1967 by J. A. Burke.) However, it is known that when a formation under investigation consists primarily of a shaly sand, the usual interpretation techniques do not apply very well. As an example, the true formation resistivity is generally high in an oil or gas bearing formation and low in a water bearing formation. However, in oil or gas bearing shaly sands, the resistivity may very well be low since the shale or clay dispersed in the pore spaces of a sand will tend to have a low resistivity. Moreover, if the formations contain a significant amount of gas, additional complications are introduced into the logs interpretation process due to the variations in response of the various exploring devices to gas.

It is therefore an object of the present invention to provide new and improved methods and apparatus for processing well logging data derived from subsurface earth formation investigating apparatus.

It is a further object of the present invention to provide new and improved methods and apparatus for processing well logging data to determine various formation characteristics of shaly sands.

In accordance with the well logging data processing methods of the present invention, measurements of porosity derived from two or more exploring devices are combined in a meaningful manner to obtain valuable information as to the nature of a formation under investigation. These exploring devices which provide porosity data can suitably comprise sonic, formation density, and neutron type exploring devices and when the measurements derived from two or more of these devices are combined together, valuable information concerning one or more of the formation clay content, gas saturation of the invaded zone (that zone invaded by the drilling mud), total formation porosity, and/or effective, nonclay filled porosity can be obtained. Although each of such exploring devices individually indicates the amount of porosity, when the measurements from two or more of these porosity sensitive devices are combined, more accurate and meaningful porosity information can be obtained.

In accordance with an important feature of the present invention, one or more of the computed formation parameters can be checked to determine feasibility. If the computed parameter is not feasible, then a suitable input parameter can be adjusted until it is feasible. For example, the travel time measurement derived from the sonic exploring device is usually combined with a formation compaction factor and a factor representative of the formation matrix travel time. If one of the computed parameters is not feasible, one or both of the compaction or matrix travel time factors can be adjusted until the computed parameter is feasible. The adjustment of these two factors gives important information regarding formation pressure.

In accordance with other important features of the present invention, the electrical resistivity of the noninvaded portion of a formation is measured and combined with the previously mentioned computed values of formation clay content and total and effective porosity to produce indications of the water and hydrocarbon saturations of the noninvaded zone. The product of the water saturation and effective porosity, which comprises the bulk volume water, and the total and effective porosity, can all be recorded on one track of a record medium to provide meaningful information as to the probability of producing a desirable amount of hydrocarbons. Additionally, the invaded zone gas saturation and non-invaded zone hydrocarbon saturation indications can be recorded on another record track to provide meaningful information as to whether gas and/or oil is present in a formation. As an addition to the feasibility test and adjustment features earlier discussed, the gas and hydrocarbon saturation indications can be tested for feasibility relative to one another based on the assumption that the gas saturation in the invaded zone should not exceed the hydrocarbon saturation in the noninvaded zone due to the invasion effect of the drilling mud.

In accordance with still other important features of the present invention, measurements of the naturally occurring spontaneous potential and natural radioactivity can be used to blank out the computations when extreme shaliness is indicated by these measurements. The reason for this is that possible inaccuracies may arise in the computed results under such extreme conditions. Moreover, it is almost impossible to produce hydrocarbons under these conditions. The spontaneous potential blank out can be prevented whenever the measured noninvaded zone resistivity becomes relatively high since such a high resistivity decreases the effectiveness or reliability of the SP measurement. Additionally, a caliper measurement of borehole diameter can be used to blank out the computations since errors may well result from measurements taken in caved-in sections of the borehole.

For a better understanding of the present invention, together with other and further objects thereof, reference is had to the following description taken in connection with the accompanying drawings, the scope of the invention being pointed out in the appended claims.

Referring to the drawings:

FIGS. 3, 4 and 5 show various portions of the FIG. 1 apparatus in greater detail;

FIGS. 6A-6C represent voltage waveforms for purposes of explaining the operation of the FIG. 1 apparatus;

Figure 7A:
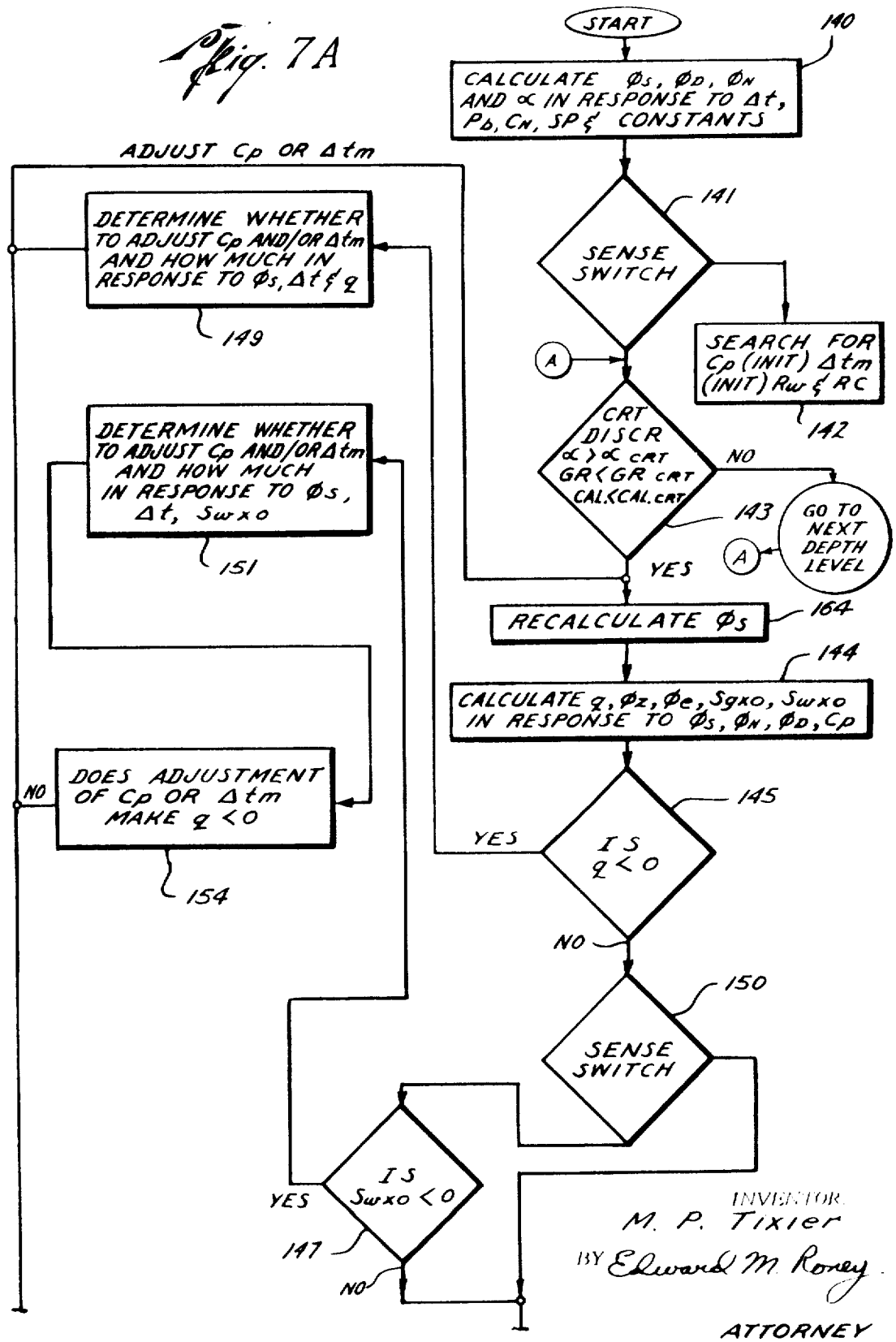
Figure 8:
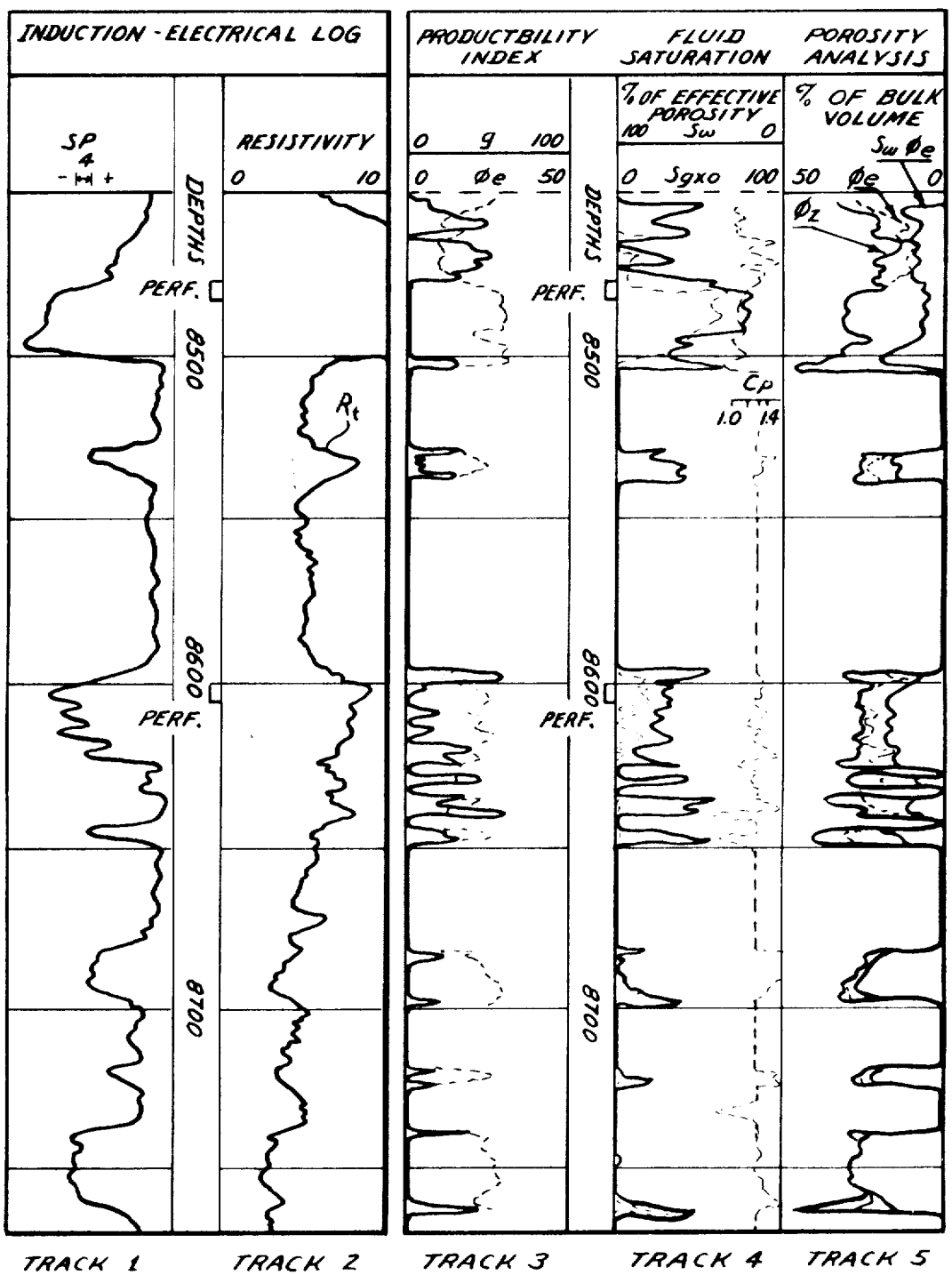
Figure 10A:
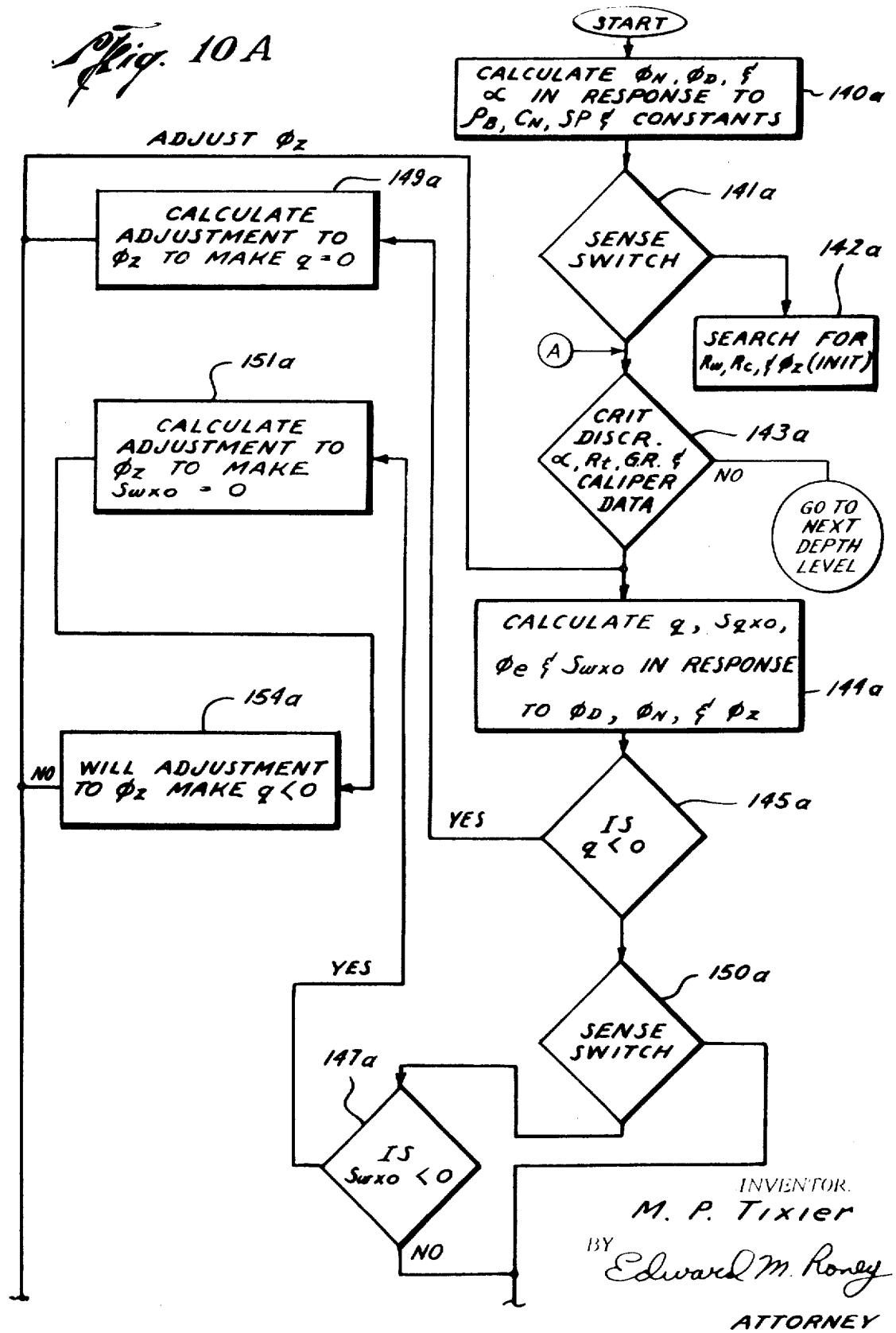

FIGS. 7A and 7B together show another embodiment of practicing the method of the present invention by appropriately programming a general purpose digital computer;

FIG. 8 shows examples of typical logs which could be obtained through the practice of the present invention;

FIG. 9 shows another embodiment for carrying out the methods of the present invention; and FIGS. 10A and 10B together show another embodiment for carrying out the same method performed by the FIG. 9 apparatus by appropriately programming a general purpose digital computer.

Figure 1:
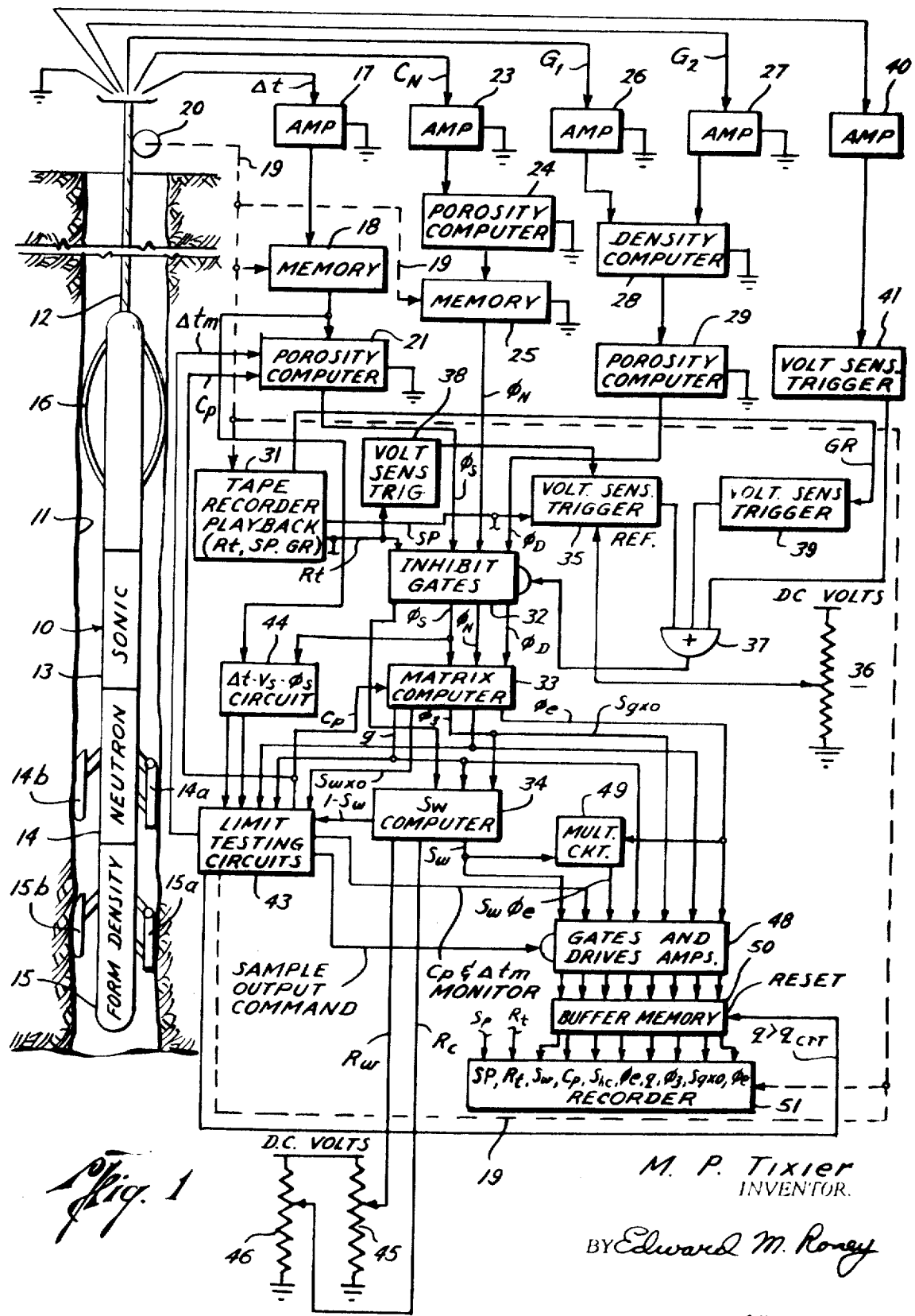
FIG. 1 shows an investigating apparatus having a plurality of exploring devices for investigating adjoining earth formations along with a schematic representation of apparatus for processing these well logging signals along with prerecorded well logging signals which are played back simultaneously with the presently derived measurements.

Now referring to FIG. 1, there is shown an investigating apparatus 10 located in a borehole 11 on the end of an armored multiconductor cable 12 which is raised and lowered in the borehole by suitable drum and winch mechanism (not shown). The investigating apparatus 10 includes a suitable sonic exploring device 13 for measuring the acoustic travel time of the formations. Sonic exploring devices of this type can be found in U.S. Pat. No. 2,938,592 granted to C. J. Charske et al. on May 31, 1960 and U.S. Pat. No. 3,231,041 granted to F. P. Kokesh on Jan. 25, 1966. The downhole investigating apparatus 10 also includes a sidewall epithermal neutron exploring device 14, having a source and detector mounted in a skid 14a, for measuring the hydrogen content of the adjoining formations and thus the porosity of the adjoining formations. Exploring devices of this type can be found in U.S. Pat. No. 2,769,918 granted to C. W. Tittle on Nov. 6, 1956 and copending application, Ser. No. 588,400 by Harold Sherman and Jay Tittman filed on Oct. 21, 1966.

If desired, a conventional neutron exploring device could be utilized in place of the sidewall epithermal neutron device. In such a conventional neutron tool, neutrons emitted into a formation are captured by certain types of atoms in the formation which results in the emission of very high-energy level gamma rays, called capture gamma rays. These capture gamma rays are counted by a nearby detector. This type of neutron tool is also primarily responsive to the hydrogen content of the formation.

The investigating apparatus 10 also includes a formation density exploring device 15 for producing well logging measurements which can be utilized to calculate the bulk density of the adjoining formations. In this regard, a skid 15a houses a source and two detectors spaced different distances from the source. This arrangement of source and detectors produces signals that correspond to the bulk density of the earth formations. The theory, construction and operation of the formation density measuring device 15 are described more completely in an article entitled "Dual Spacing Formation Density Log" by J. S. Wahl, J. Tittman, C. W. Johnstone and R. P. Alger, *Journal of Petroleum Technology*, Dec. 1964, pages 1,411-1,416; an article entitled "The Physical Foundations of Formation Density Logging (Gamma-Gamma)" by J. Tittman and J. S. Wahl, *Geophysics*, Apr. 1965, pages 284-294; an article entitled "Formation Density Log Application in Liquid-Filled Holes" by R. P. Alger, L. L. Raymer, Jr., W. R. Hoyle and M. P. Tixier, *Journal of Petroleum Technology*, Mar. 1963, pages 321-332; and U. S. Pat. No. 3,321,625 granted on May 23, 1967 to John S. Wahl and assigned to the same assignee as the invention described herein.

To keep the investigating apparatus 10 centered in the borehole, a pair of extendible wall-engaging members 14b and 15b are provided opposite the pad members 14a and 15a. To keep the upper portion of the investigating apparatus 10 centered, a plurality of spacers 16 are provided. A borehole caliper also is combined with the arms which extend the skids 15a and 15b and supplies a signal representative of borehole diameter to the surface of the earth.

Now concerning the circuitry at the surface of the earth, the signals $G_1$ and $G_2$ derived from the short and long spacing detectors of the formation density tool 15 are in the form of pulses whose repetition rates are representative of the measured parameters. These count rate signals $G_1$ and $G_2$ are amplified by a pair of amplifiers 26 and 27 respectively and are applied to a density computer 28 which computes the bulk density $\rho_B$ of the adjoining formations. If desired, the caliper signal can be applied to the density computer 28 to be used in the computation of bulk density $\rho_B$. The resulting bulk density signal $\rho_B$ is applied to a porosity computer 29 which computes the porosity $\phi_D$, as derived from the bulk density signal, in accordance with the relationship:

$$\phi_D = \rho_G - \rho_B/\rho_B - \rho_F \quad (1)$$

where $\rho_G$ is the grain density of the formation rock material and $\rho_F$ is the density of the fluid in the formation pore space.

The travel time measurement $\Delta t$ derived from the sonic exploring device 13 is supplied to a suitable amplifier 17 which supplies the amplified output signal to a suitable memory 18. The memory 18 acts to store the sonic travel time signals $\Delta t$ for a given depth interval so as to depth synchronize the sonic logging signal $\Delta t$ with the signals derived from the formation density tool 15. The memory 18 could comprise any suitable memory device such as a rotating magnetic or capacitor memory which stores incoming signals for a sufficient depth interval for subsequent readout. The memory 18 is driven as a function of borehole depth by a shaft 19 coupled to a rotating wheel 20 which engages the cable 12.

The depth synchronized sonic travel time signal $\Delta t$ is supplied to a suitable porosity computer which is arranged to solve Wyllie's time average formula for sonic derived porosity $\phi_s$. Wyllie's time average formula is:

$$\phi_s = \Delta t - \Delta t_m/\Delta t_f - \Delta t_m \quad (2)$$

where $\Delta t_f$ is the sonic travel time in the interstitial fluid and $\Delta t_m$ is the sonic travel time in the formation rock matrix.

Equation (2) is accurate for clean (nonshaly) and well compacted water sand, but needs to be adjusted by a compaction correction factor $C_p$ in uncompacted sands. Thus, rewriting Equation (2) with this compaction correction factor:

$$\phi_s = (\Delta t - \Delta t_m/\Delta t_f - \Delta t_m) \cdot (1/C_p) \quad (3)$$

where $$C_p = C\Delta t_{sh}/100 \quad (4)$$

and $\Delta t_{sh}$ is the sonic travel time for shale. The sonic compaction factor $C_p$ can be ascertained from comparison with resistivity or other porosity values in clean water sands. (e.g., Measure $\phi_s$ and $\phi_D$ and/or $\phi_N$ in a clean water sand where all porosity values would be equal and adjust $C_p$ to make $\phi_s = \phi_D$ and/or $\phi_N$.)

The neutron signal N is in the form of a series of pulses proportional to the hydrogen content and thus porosity of the adjoining formations. This neutron count rate is supplied via an amplifier 23 to a suitable porosity computer 24 which acts to convert the neutron count rate N to a DC signal proportional to neutron derived porosity $\phi_N$. This computer can be arranged as shown in the above-mentioned Sherman and Tittman copending application. This neutron derived porosity signal $\phi_N$ is supplied to a suitable memory 25 driven by the shaft 19. The memory 25 is similar to the memory 18 and acts to depth synchronize the neutron derived porosity signal $\phi_N$ with the bulk density signal $\rho_B$ and the sonic travel time signal $\Delta t$.

The derivation of the measurements discussed thus far represents investigating techniques well known in the well logging art. However, none of the above-described measurements, taken alone, provides a complete answer as to many of the characteristics of the adjoining formations. Thus, for example, in shaly water sands, the sonic or neutron log, taken alone, may reliably give the total formation porosity $\phi_z$ but will not indicate the percentage of this porosity which contains clay, which percentage is defined as "$q$." The density log, on the other hand, in clean water sands, gives a reliable indication of the effective porosity $\phi_e$, i.e., that portion of the pore spaces which does not include clay. Even in shaly water sands, the density log can give a reliable indication of the effective porosity $\phi_e$ by assuming that the shale or clay disseminated in the sane has the same density as the sand grains. For greater precision in determining $\phi_e$, the density $\rho_c$ of the disseminated clay must be considered as follows:

$$\phi_e = \frac{(1-q)(\rho_m - \rho_B)}{\rho_m - \rho_f - q(\rho_c - \rho_f)} \quad (5)$$

Thus, it can be seen that the sonic, neutron or density logs will not individually give a complete story of formation conditions in shaly sands. It is known however, that two of these logs can be combined to give $\phi_z$, $\phi_e$ and $q$ in shaly water sands. For example, see U.S. Pat. No. 3,500,683 granted to William R. Hoyle on Mar. 17, 1970. It is also known that by measuring the noninvaded zone resistivity $R_t$ with, for example, an induction coil type exploring device, the water saturation $S_w$, i.e., that percentage of the uncontaminated portion of the formation filled with water, can be solved for with the expression:

$$S_w = \frac{\sqrt{\frac{F_z R_w}{R_t} + \left[\frac{q(R_c - R_w)}{2R_c}\right]^2} - \frac{q(R_c + R_w)}{2R_c}}{1-q} \quad (6)$$

where $F_z$ is the apparent formation resistivity factor corresponding with $\phi_z$, i.e., $F_z = (0.62/\phi_z 2.15)$.

$R_w$ is the resistivity of the naturally occurring formation water and can be obtained from the true formation resistivity $R_t$ and the formation factor $F_z$ derived from the total porosity $\phi_z$ given directly from the sonic log when not affected by hydrocarbons. Alternatively, $R_w$ can be obtained from the SP log in a well known manner or from previous knowledge of the area.

$R_c$ is the resistivity of the disseminated clay which can be obtained from the true formation resistivity $R_t$ measured in nearby shale beds, or alternatively, can be assumed to be $10R_w$.

While the above equations can be used to solve for various formation characteristics in shaly water sands, the effect of hydrocarbons, especially gas, on these logs may cause further changes in their responses which changes cannot easily be ascertained from one or even two porosity logs. For example, the sonic travel time $\Delta t$ tends to increase in the presence of hydrocarbons, especially gas, in uncompacted formations. This effect does not appear to take place in well compacted formations and after some investigation, it has been found that the required correction is related to the compaction correction, i.e., the larger the compaction correction required, the larger the gas correction seems to be.

Thus, to take into account this gas effect on the sonic log, equation (3) for the sonic derived porosity $\phi_s$ can be rewritten as:

$$\phi_s = \phi_e + q\phi_z + (C_p - 1)\phi_e S_{gxo} \quad (7)$$

where $S_{gxo}$ is the residual gas saturation in the invaded zone, i.e., the zone close to the borehole. (This "$xo$" is due to the shallow depth of investigation of the sonic tool.) Equation (7) then gives the sonic derived porosity in either clean or shaly gas sands. Since the coefficient $(C_p - 1)$ of the last term of equation (7) was selected for gas, it will tend to be too high if oil is, in fact, the hydrocarbon present in the formation and should be reduced to the coefficient for a liquid hydrocarbon in this event. As will be shown later, whether gas or oil is present in a formation can be checked by comparison of various ones of the computed results.

When hydrocarbons are present in the formation, the value of porosity derived from the formation density tool will likewise tend to be incorrect because of the variations in the actual fluid density $\rho_F$ from the preselected value. This is especially true for gas because of its low density. It has been found that the porosity $\phi_D$ given by the density log is related to the effective porosity $\phi_e$ and invaded zone gas saturation as follows:

$$\phi_D = \phi_e + 0.5\phi_e S_{gxo} \quad (8)$$

In shallow gas sands where pressures are low, the coefficient of the second term may have to be increased to 0.6.

Concerning the factors affecting the response of the neutron log, it is known that in clean or shaly water sands, the neutron log has the same response as the sonic log. However, in gas sands, the neutron response is completely different from the sonic response. After extensive research and experimentation, it has been found that the porosity $\phi_N$ derived from the neutron log can be expressed as follows:

$$\phi_N = \phi_e + q\phi_z - N\phi_e S_{gxo} \quad (9)$$

where $$N = 0.5 \left[\frac{\phi_s - \phi_N}{\phi_D - \phi_s}\right] \quad (10)$$

The value of $N$ is computed from the values of $\phi_s$, $\phi_N$ and $\phi_D$ measured in well compacted gas sands. In most cases, the value of $N$ has been found to be 0.7. If the hydrocarbons in the formation are liquid rather than gas, there may well be little or no hydrocarbon effect on the neutron response and if the liquid hydrocarbon is heavy, the hydrocarbon effect will tend to increase rather than decrease the apparent neutron log derived porosity.

From the above discussion, it can be seen from equations (7), (8) and (9) that the response of the sonic, neutron, and density tools to gas can now be taken into account. (It should be noted here that the hydrocarbons in the invaded zone are assumed to be gas, and thus gas constants are used in equations (7–9) as a first assumption. If this first assumption is found to be erroneous, the hydrocarbon constants can be appropriately changed, if desired.) However, it can be seen from equations (7), (8) and (9) that there are four unknowns (i.e., $\phi_e$, $q$, $\phi_z$ and $S_{gxo}$) and only three equations. However, by definition, a fourth equation can be written as follows:

$$\phi_z = \phi_e + q\phi_z \quad (11)$$

Thus by solving equations (7), (8), (9) and (11) simultaneously, the solutions for the four unknowns can be produced. By transposition, we can rewrite equations (7), (8), (9) and (11) in a form more suitable for determination of the unknown quantities. Thus, $$\phi_e S_{gxo} = \frac{\phi_s - \phi_N}{C_p - 0.3} \quad (12)$$

$$\phi_e = \phi_D - 0.5\phi_e S_{gxo} \quad (13)$$

$$\phi_z = \phi_N + 0.7\phi_e S_{gxo} \quad (14)$$

$$q = \frac{\phi_z - \phi_e}{\phi_z} \quad (15)$$

With the values of $\phi_z$ and $q$ determined from equations (14) and (15), equation (5) then can be used to solve for water saturation $S_w$.

It will be noted that the values computed by equations (12–15) are dependent on the sonic compaction correction factor $C_p$. As stated earlier, the value of $C_p$ is obtained by the comparison of neutron, density, and sonic logs (or perhaps just the sonic and neutron logs) in clean water sands. However, it has been found that nearby water sands may not reflect the appropriate compaction factor $C_p$ for a gas or oil sand. This is especially so where the need for compaction correction is caused by abnormal formation pressures. This erroneous selection of the sonic compaction correction factor $C_p$ comes to light when the solution of equations (6) and (12–15) produces a negative value of $q$ or a gas saturation $S_{gxo}$ value which is greater than the value of $1-S_w$. ($1-S_w$) is equal to the hydrocarbon saturation $S_{hc}$ in the noninvaded zone.) Since the invading mud filtrate displaces some hydrocarbons, the invaded zone hydrocarbon saturation must be less than the noninvaded zone hydrocarbon saturation and, in most cases, it has been found that $S_{gxo}$ should be less than approximately $0.7(1-S_w)$.

In accordance with an important feature of the present invention, it has been found that, if the computed parameters are found to be nonfeasible, the sonic compaction correction factor $C_p$ or the sonic matrix travel time $\Delta t_m$ can be adjusted until the computed parameters are feasible. The sonic compaction correction factor $C_p$ is adjusted until $C_p$ reaches a minimum of 1.0, which is the minimum value that $C_p$ can have, to cause the computed parameters to become feasible. If the computed parameters are still not feasible after $C_p$ has been reduced to its minimum value of 1.0, then the sonic matrix travel time factor $\Delta t_m$ must not have been properly selected and thus, is thereafter decreased until the computed parameters are feasible. These new values of $C_p$ or $\Delta t_m$ are then used again in equations (3) and (12–15) to bring about the proper feasible solutions.

Figure 2:
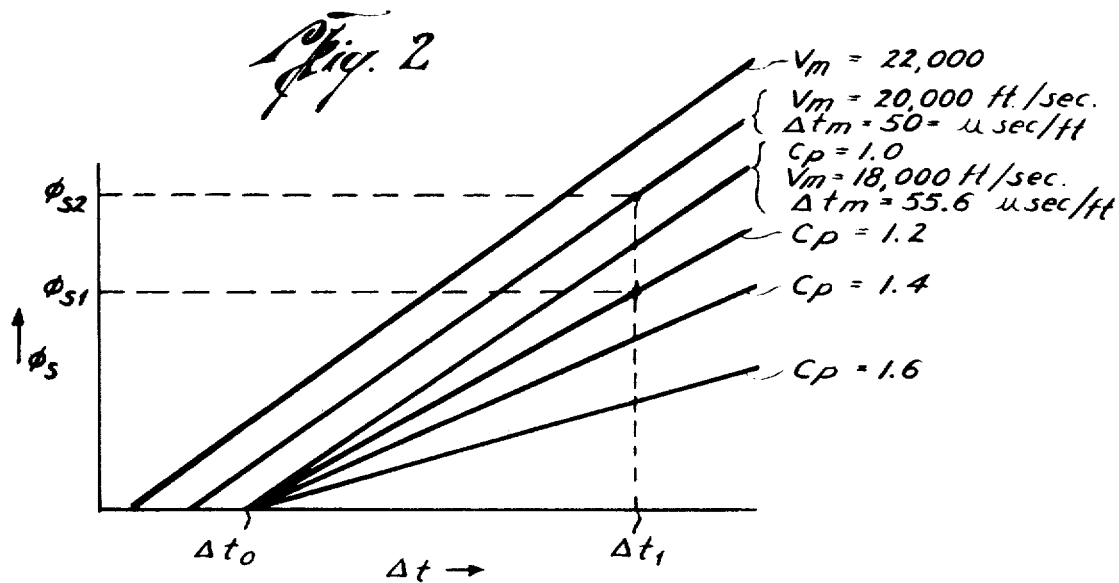
FIG. 2 shows a graphical plot of the sonic derived porosity $\phi_s$ versus the sonic travel time $\Delta t$ for purposes of explaining certain features of the present invention.

To better understand this variation of $C_p$ or $\Delta t_m$, refer to FIG. 2 where there is shown a graph of $\Delta t$ versus $\Delta_s$ with curves representing various values of $C_p$ and $\Delta t_m$. This graph represents how the $\phi_s$ computer 21 operates to produce $\phi_s$ from the $\Delta t$ measurements. To find $\Delta_s$ from a given $\Delta t$ value, the $\Delta t$ value is projected off of the proper preselected $\Delta t_m$ or $C_p$ line to the vertical axis. As an example, assume that the measured $\Delta t$ value is $\Delta t_1$ and that $C_p$ is initially selected to be 1.2. In this event, by projecting a vertical line to the $C_p$=1.2 line and, from there, a horizontal line to the $\phi_s$ axis, the value of $\phi_{s_1}$ is found.

Now assume that one of the earlier discussed feasibility tests was not satisfied and that $C_p$ is decreased to satisfy the feasibility test. In this event $C_p$ will be reduced to a value as low as $C_p$=1.0, if necessary, to satisfy the test. If however, the test is still not satisfied after $C_p$ has been reduced to 1.0, then $C_p$ is left at a value of 1.0 and $\Delta t_m$ is thereafter adjusted. If $\Delta t_m$ is adjusted to a value of $\Delta t_m$=50 u sec/ft. before the feasibility test is satisfied, then $\phi_s$ has a new value $\phi_{s_2}$. Thus, this new value $\phi_{s_2}$ as well as the $C_p$ value of 1.0 are then used in the solution of equations (12–15). It can thus be seen that for any given value of $\Delta t$, only one of the family of $C_p$ and $\Delta t_m$ lines of FIG. 2 will eventually be chosen as the proper transfer line to compute $\phi_s$.

It is to be understood that if a $\Delta t_m$ line is the initial transfer line and $\Delta t_m$ is to be increased to satisfy one or more of the feasibility tests, $\Delta t_m$ will be increased to a maximum of $\Delta t_m$=55.6 u sec./ft. and $C_p$ will thereafter be increased in a manner similar to the earlier discussed case where $C_p$ was decreased.

These changes in the sonic compaction correction factor $C_p$ and sonic matrix travel time $\Delta t_m$ can also be utilized to great advantage in diagnosing various formation conditions. For example, a sand requiring a higher $C_p$ than is appropriate for adjacent sands is indicated to be at a higher pressure than the pressure exerted in the adjacent sands. Conversely, if to satisfy the feasibility tests a reduced $C_p$ is computed, the sand may have a lower pressure than its neighbors. Additionally, if limy sands are encountered, the $C_p$ value would be reduced. On the other hand, invalid sonic readings caused by cycle skipping or noise would lead to $C_p$ anomalies, i.e., $C_p$ disturbances which would be quite sharp and erratic. Also, it has been found that reduced $C_p$ values can indicate severe hole enlargement and rugosity.

The computed results obtained from the above equations are also useful in identifying whether the hydrocarbons present in the formation are gas or oil or some combination thereof. For example, it has been found that when the gas saturation value $S_{gxo}$ is one-half or more the value of $1-S_w$, there is a strong likelihood that the formation is comprised of primarily gas. To the contrary, when a liquid hydrocarbon is present in the formation, the computed value of $S_{gxo}$ is generally quite small, sometimes even negative. The reason for such a low or negative value of $S_{gxo}$ is that the constants used in equations (12–15) were selected for gas and thus will not give accurate values of $S_{gxo}$ when any appreciable amount of liquid hydrocarbons are present in the formation. In the event that oil is present, the gas constants in equations (12–15) may be changed to oil constants and $S_{gxo}$ is changed to $S_{oxo}$. The equations can then be solved again.

However, this resolving of equations (12–15) is not entirely necessary. As far as the values of $q$, $\phi_e$, $\phi_z$ are concerned, equations (12–15) will tend to balance one another and will, for the most part, give fairly accurate readings of $q$, $\phi_z$ and $\phi_e$ regardless of the type of hydrocarbons present in the formation. Therefore, the value of water saturation $S_w$ computed from equation (6) will also be reasonably accurate regardless of the type of hydrocarbon. Thus, it follows that the hydrocarbon saturation ($1-S_z$) in the noninvaded zone will also be reasonably accurate regardless of the type of hydrocarbon present.

The parameters computed from equations (12–15) can also be utilized to determine when it is advantageous to perforate a well for producing oil or gas. For example, it has been found that when the value of $q$ is larger than one-half the $q$ value computed in adjacent shale formations, there is little chance of producing a commercial quantity of hydrocarbons. Additionally, by recording the total porosity $\phi_z$, the effective porosity $\phi_e$, and the percentage of the total formation bulk volume which contains water, i.e., $S_w\phi_e$, the bulk volume amounts of clay, water, and hydrocarbon which fill the formation pore spaces can be determined at a glance. Thus, the difference between $\phi_z$ and $\phi_e$ represents the bulk volume clay content, the value $S_w\phi_e$ represents the bulk volume water content and the difference between $\phi_e$ and $S_w\phi_e$ represents the bulk volume hydrocarbon content in the formation.

The equations utilized with the present invention are based on a formation model which assumes that clay is disseminated in the sand beds. If the formation beds are extremely shaly, it is possible that inaccurate computed results will be obtained. To prevent this from happening, the computations are not performed when extreme shaliness is indicated from the spontaneous potential or the gamma ray log.

First concerning the spontaneous potential log, it is known that the spontaneous potential log (SP) will provide a maximum positive amplitude in shale beds and a maximum negative amplitude in sand beds. By observing an SP log over a given interval of the formation, a shale base line and a sand base line can both be drawn, the shale base line value being called the pseudo static SP (PSP) and the sand base line value being called the static SP (SSP). The ratio of the values of these two base line values, PSP/SSP, called the SP reduction factor $\alpha$, is then used to select a cutoff value which is compared with the SP value measured at any given depth level to determine the relative shaliness of a formation. If the SP value is less than this limit, thus indicating extreme shaliness, the computations may not be made.

However, if hydrocarbons are present in the formation, the SP value will be substantially reduced even though the formation is not shaly to any great extent. In such hydrocarbon bearing formations, the true resistivity $R_t$ of the noninvaded zone will be substantially high. Thus, a high value of $R_t$ can be used to eliminate or inhibit the cutoff arising from the SP log.

As with the SP log, the gamma ray log is a good indicator of shaly formation beds. It is known that shaly formations generally have a greater radioactive content than do other type of formations. Thus, the count rate derived from a gamma ray exploring device will be substantially greater in shaly formations than in other types of formations. This information can then be used to cut off the above computations.

In addition to cutting off the computations in extremely shaly formations, it is many times desirable to also cutoff the computations when the borehole diameter becomes larger than usual. The reason for this is that calibration errors may be introduced into the measurements due to the affect of the increased borehole size on the responses of the various exploring devices.

Now returning to FIG. 1, there is shown apparatus for automatically carrying out the operations set forth above. As stated previously, the sonic, neutron, and density derived values of porosity are obtained from the porosity computer 21, the porosity computer 24 and associated memory 25, and the density computer 28 and associated porosity computer 29 respectively. In addition, prerecorded values of $R_t$, SP and the gamma ray count rate are played back in depth synchronism with the measurements being presently obtained from the investigating tool 10. (It is to be understood that, in accordance with the present invention, all of the measurements can be made at the same time or they can all be made independently and stored for later use, or any combination thereof.)

The measurements of $R_t$, $\phi_s$, $\phi_N$, and $\phi_D$ are supplied to a plurality of parallel inhibit gates 32 which, when unenergized, apply the porosity measurements $\phi_s$, $\phi_N$ and $\phi_D$ to a matrix computer 33 and the $R_t$ measurement to a $S_w$ computer 34. To control the inhibit gates 32, the SP measurements from the tape recorder 31 are applied to the input of a voltage sensitive trigger 35 whose reference voltage is derived from a potentiometer 36. This reference value is set in accordance with the shale and sand base line values obtained, for example, by visual inspection of the SP log so that an output will be generated from trigger 35 when extreme shaliness is indicated. This output signal from the voltage sensitive trigger 35 energizes the inhibit gates 32 by way of an OR-gate 37.

A voltage sensitive trigger 38 is responsive to the played back values of true formation resistivity $R_t$ for generating an output signal whenever the value of $R_t$ exceeds a given prescribed level. This output signal is then utilized to inhibit the operation of the voltage sensitive trigger 35. This conforms with the previous discussion of using the true formation resistivity values $R_t$ for identifying oil or gas sands which may unduly affect the derived SP measurements.

The inhibit gates 32 can also be energized when the gamma ray count rate exceeds a predetermined level (thus indicating shaliness) as sensed by a voltage sensitive trigger 39, whose output is also applied to the OR-gate 37. Additionally, the caliper or borehole diameter measurements from the investigating apparatus 10 are amplified by an amplifier 40 for application to a voltage sensitive trigger 41 whose output signal energizes the inhibit gates 32 by way of the OR gate 37 whenever the borehole diameter exceeds a prescribed limit. As discussed earlier, this tends to eliminate questionable measurements.

If the formations are not too shaly and the borehole diameter is within prescribed limits, the matrix computer 33 then acts to compute the values of $q$, $\phi_z$, $S_{gxo}$ and $\phi_e$ in accordance with equations (12–15). Additionally, the value of invaded zone water saturation $S_{wxo}$ is also computed from the relationship $S_{wxo}=1-S_{gxo}$. The computed values of $q$, $S_{gxo}$ and $S_{wxo}$ are supplied to limit testing circuitry 43 which operates to test the feasibility of these computed results and adjusts the sonic matrix travel time $\Delta t_m$ and/or the sonic compaction correction factor $C_p$ which is generated from circuitry 43. The operation of the limit testing circuitry 43 is synchronized with the movement of the downhole investigating apparatus by shaft 19. The value of $C_p$ generated from circuitry 43 is supplied to both the sonic porosity computer 21 and the matrix computer 33 since the values of $C_p$ are found in both equations (3) and (12) and the generated value of $\Delta t_m$ is supplied to the sonic porosity computer 21 since $\Delta t_m$ is variable in equation (3) only.

To determine which parameter, $C_p$ or $\Delta t_m$, should be adjusted, a $\Delta t$ versus $\phi_s$ circuit 44 is responsive to the values of $\Delta t$ and $\phi_s$ for generating either a "vary $\Delta t_m$ command" or a "vary $C_p$ command" depending on which side of the $C_p = 1.0$ line (See FIG. 2) the $\Delta t$ versus $\phi_s$ point falls. This determination can be accomplished electronically by merely providing a computer which solves the equation for the $C_p = 1.0$ line and generates a positive or negative output signal depending on which side of the $C_p = 1.0$ line the $\Delta t$, $\phi_s$ point falls. Thus, if S is the slope of the $C_p = 1.0$ line and $\Delta t_O$ is its intersection with the $\Delta t$ axis, the equation for this line can be written as:

$$\phi_s - S(\Delta t - \Delta t_0) = 0.$$

If the $\Delta_s$, $\Delta t$ point falls above the line, the computer output will be positive and if it falls below the line, the computer output will be negative. Therefore, suitable polarity sensing circuits can detect the polarity of the computer output to generate either the "vary $\Delta t_m$ command" or the "vary $C_p$ command." A computer of this type is described in the copending Burke application, Ser. No. 672,267.

The limit testing circuit 43 then proceeds to check the various outputs of the matrix computer 33 to determine if the answers are feasible and, if not, initially adjusts either the sonic compaction correction factor $C_p$ or the sonic matrix travel time $\Delta t_m$ to obtain a feasible solution. Since, as discussed earlier, the lowest possible value of $C_p$ is 1.0, the limit testing circuitry 43 does not adjust $C_p$ below its minimum value of 1.0 but leaves $C_p$ at a value of 1.0 then proceeds to adjust $\Delta t_m$ to bring about a feasible solution.

Concerning the particular limits that are tested, the limit testing circuitry 43 acts to insure that the shale percentage factor $q$ is not less than 0 or greater than 1, i.e., the shale percentage is not less than 0 percent nor greater than 100 percent. Additionally, the limit testing circuitry 43 checks to determine if the invaded zone gas saturation $S_{gxo}$ is greater than 1. Since $S_{gxo}$ is equal to $1 - S_{wxo}$, the circuitry 43 determines if $S_{gxo}$ is greater than 1 by checking to see if $S_{wxo}$ (water saturation in the invaded zone) is less than 0. In accordance with the earlier discussion, the limit testing circuitry 43 checks to determine if the invaded zone gas saturation factor $S_{gxo}$ is greater than a given percentage of the noninvaded zone hydrocarbon saturation $1 - S_w$. If $S_{gxo}$ is greater than $0.7(1 - S_w)$, the limit testing circuitry 43 acts to adjust the value of either $C_p$ or $\Delta t_m$ until $S_{gxo}$ is equal to $0.7(1 - S_w)$.

These various limit conditions may cause the adjustment of $C_p$ or $\Delta t_m$ to be in opposite direction thus giving rise to a possibility that the satisfaction of one limit condition will cause another limit condition to become unsatisfied. It has been found that satisfaction of certain ones of the limit conditions are more important than satisfaction of others. Thus, the limit testing circuitry 43 acts to take into account these preferences and inhibit the satisfaction of a low order limit condition when it is found that its satisfaction would cause higher order limit conditions to become unsatisfied.

In accordance with equation (6), the computed values of $\phi_s$ and $q$ from the matrix computer 33, as well as the true resistivity $R_t$, are supplied to the water saturation $S_w$ computer 34 to calculate $S_w$. Additionally, a pair of potentiometers 45 and 46 supply values of water resistivity $R_w$ and the resistivity of the disseminated clay $R_c$ to the $S_w$ computer 34. As discussed earlier, the value of $R_w$ can be determined from the porosity and $R_t$ values obtained in clean water sands and the value of $R_c$ is selected to be $10R_w$, or alternatively, it can be found from values of $R_t$ obtained in shale beds.

Thus, it can be seen that the matrix computer 33 and $S_w$ computer 34 calculate $q$, $\phi_z$, $\phi_e$, $S_{gxo}$, $S_{wxo}$, $S_w$, $1 - S_w$ from the measurements derived from various downhole exploring devices in accordance with equations (6) and (12-15). Then, the limit testing circuitry 43 checks certain ones of the results to determine if they are feasible and, if not, adjusts $C_p$ and/or $\Delta t_m$ to make the results feasible. Once the feasible solutions have been obtained, all of the computed output functions, namely, $q$, $\phi_z$, $S_{oxo}$, $\phi_e$, $S_w$ are supplied to a plurality of parallel gates and driver amplifiers 48. Additionally, a multiplying circuit 49 is responsive to the computed values of $S_w$ and $\phi_e$ for producing a signal output $S_w\phi_e$ which is proportional to the bulk volume water content. The limit testing circuitry 43 also generates an output signal representative of the value of $C_p$ or $\Delta t_m$ depending on which side of the $C_p = 1.0$ line of FIG. 2 the $\Delta t$, $\phi_e$ point falls. This $C_p$ and $\Delta t_m$ monitor is also supplied to the gates and river amplifiers 48.

Upon the generation of a suitable command designated "-sample output command" from the limit testing circuitry 43, the gates 48 are opened to energize the driver amplifiers for application of the various signal to a buffer memory 50. This buffer memory could take the form of a plurality of parallel capacitors and suitable high impedance output amplifiers for driving a recorder 51. The recording medium of recorder 51 is driven as a function of depth by the shaft 19 from the rotating wheel 20 for producing logs of the various computed parameters.

As stated earlier, the computed results may not be accurate if the formations are too shaly. As a further check on this, the computed value of $q$ can be used to inhibit the recording of the computed results whenever $q$ exceeds a given level. To prevent the computed results from being recorded in this event, the limit testing circuitry 43 can be adapted to generate a signal for discharging the capacitors of the buffer memory 50 when the computed $q$ is greater than this critical $q$ value.

Figure 3:
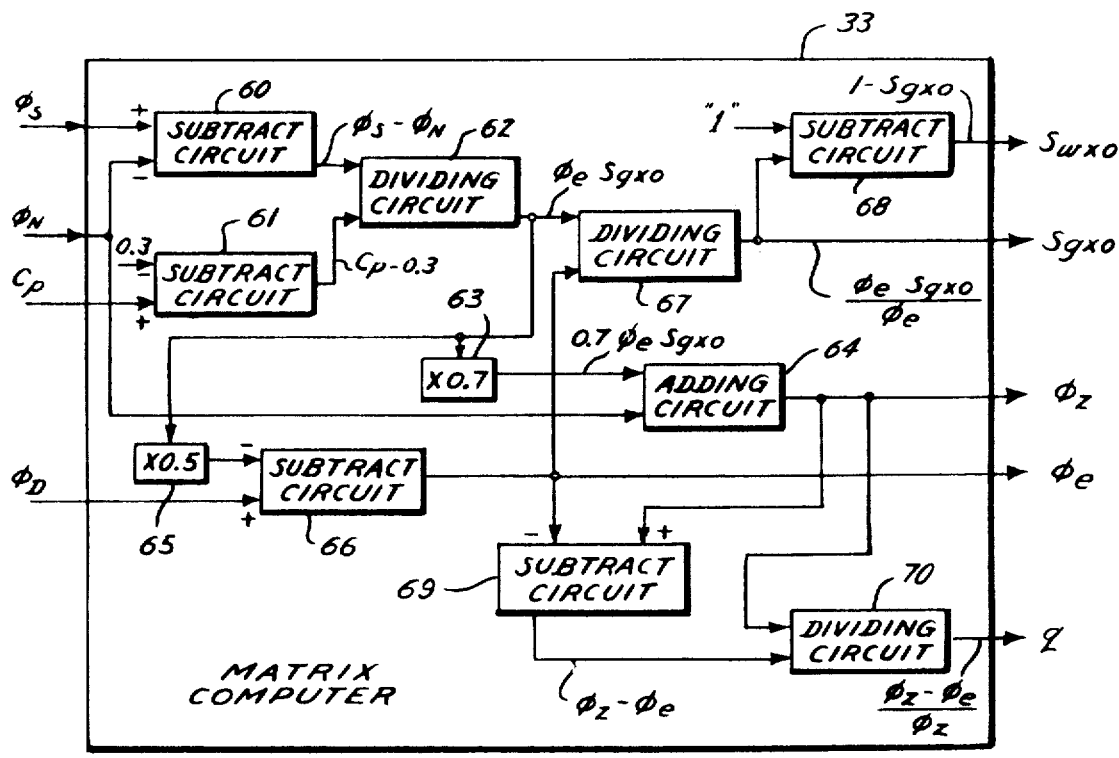

Now referring to FIG. 3, there is shown the matrix computer 33 in greater detail. The sonic and neutron derived porosity values $\phi_s$ and $\phi_N$ are supplied to a subtraction circuit 60 which acts to subtract $\phi_N$ from $\phi_s$. A signal proportional to a constant 0.3 is subtracted from the sonic compaction correction factor $C_p$ in a subtraction circuit 61 and the resulting signal proportional to $C_p - 0.3$ is divided into the signal proportional to $\phi_s - \phi_N$ in a dividing circuit 62 so as to produce the signal $\phi_e S_{oxo}$ in accordance with equation (12). This output signal from dividing circuit 62 is multiplied by a constant proportional to 0.7 in a suitable means 63, which could take the form of a potentiometer, and the resulting signal $0.7\phi_e S_{oxo}$ is supplied to an adding circuit 64 which is also responsive to $\phi_N$ to produce an output signal representative of the total porosity $\phi_z$.

The signal from dividing circuit 62, proportional to $\phi_e S_{oxo}$, is also multiplied by the factor one-half in a suitable circuit 65, e.g., a potentiometer, and subtracted from the density derived porosity value $\phi_D$ in a subtraction circuit 66 to produce a signal proportional to the effective porosity $\phi_e$. This effective porosity signal is divided into the signal $\phi_e S_{oxo}$ in a dividing circuit 67 to produce a signal proportional to $S_{oxo}$. This $S_{oxo}$ signal is subtracted from a constant voltage proportional to unity in a subtraction circuit 68 to produce the invaded zone water saturation value $S_{woxo}$. Additionally, $\phi_e$ is subtracted from $\phi_z$ in a subtraction circuit 69 and divided by $\phi_z$ in a dividing circuit 70 to produce a signal proportional to the percentage of shale $q$.

Now turning to FIG. 4 there is shown the $S_w$ computer of FIG. 1 in greater detail. Briefly, the input signal $\phi_z$ is supplied to a function forming circuit 75 which operates to produce the resistivity formation factor $F_z$ from the expression $F_z = 0.62/\phi_{zed}^{2.15}$. Function forming circuits suitable for performing this calculation are well known in the electronics art. This $F_z$ quantity along with the quantity $R_w/R_t$ derived from a divider circuit 76 which is responsive to $R_w$ and $R_t$, are combined in a multiplication circuit 77 to produce the quantity $F_z R_w/R_t$. In like fashion, the input signals $q$, $R_c$ and $R_w$ are combined in a multiplication circuit 78, dividing circuit 79, subtraction circuit 80, multiplication circuit 81 and squaring circuit 82 in an appropriate manner to produce the function $$\left[\frac{q(R_c - R_w)}{2R_c}\right]^2$$

This output signal is combined with the quantity $F_z R_w/R_t$ in an adding circuit 83 and the square root thereof taken by a suitable function forming circuit 84. Likewise, the input variables $q$, $R_c$ and $R_w$ are combined in the multiplication circuit 78, adding circuit 85, dividing circuit 86, and a multiplication circuit 87 in an appropriate manner to produce the quantity $q(R_c + R_w)/2_c$ and this quantity is subtracted from the output signal from the square root function forming circuit 84 in a subtraction circuit 88 to produce the numerator of equation (6). The denominator of equation (6) is produced by deriving the quantity $1 - q$ from a subtraction circuit 89 which subtracts $q$ from unity. This quantity $1 - q$ is then divided into the output signal from subtraction circuit 88 (numerator of equation 6) in a dividing circuit 90 to produce $S_w$. The hydrocarbon saturation value $S_{hc}$, which is equal to $1 - S_w$, is produced by subtracting $S_w$ from unity in a subtraction circuit 91.

Now concerning the limit testing circuitry 43 in greater detail, refer to FIG. 5. The computed quantities $q$ and $S_{oxo}$ are supplied to sample and hold amplifiers 95 and 97 respectively by way of back-biased diodes 98 and 100 so that the sample and hold amplifiers 95 and 97 will only be responsive to negative signals. The $q$ signal is compared with a voltage representative of unity in a differential amplifier 101 and a signal representative of the quantity $q - 1$ is supplied to a sample and hold amplifier 102 by way of a positive biased diode 104 only if $q$ is greater than 1. The gas saturation quantity $S_{oxo}$ is compared with the quantity $0.7(1 - S_w)$ in a differential amplifier 107, the quantity $0.7(1 - S_w)$ being derived from a potentiometer 108. The quantity $S_{oxo} - 0.7(1 - S_w)$ is supplied to a high gain amplifier 105 by way of a forward biased diode 106 and gate 107a only if $S_{oxo}$ is greater than $0.7(1 - S_w)$. The sample and hold amplifiers 95, 97, 102 and high gain amplifier 105 are energized to receive the respective input voltages in response to timing signals $t_1-t_4$ generated from a suitable timing circuit 103 which generates signals as a function of depth in response to the rotating shaft 19.

Concerning the operation of this portion of the circuitry just described, the sample and hold amplifier 95 is first energized to measure the amount, if any, that $q$ is less than zero in response to a first timing signal $t_1$ from timing circuit 103 and sample and hold amplifier 97 is subsequently energized by timing signal $t_2$ to measure the amount, if any, that $S_{oxo}$ is less than zero. The sample and hold amplifier 102 is thereafter energized by timing signal $t_3$ to measure the amount, if any, that $q$ is greater than one. Subsequently, gate 107a is energized in response to the timing signal $t_4$ by way of an AND-gate 134 to pass a signal proportional to the amount, if any, that $S_{oxo}$ is greater than $0.7(1 - S_w)$ to the high gain amplifier 105. (Assume for the present that the AND-gate 134 is enabled to pass $t_4$.)

The output of all of the sample and hold amplifiers is supplied to a weighted combining circuit 109 which acts to combine the various input signals thereto. It has been found that the amount of variation to $C_p$ and/or $\Delta t_m$ is explicit for the tests $0 < q < 1$ and $S_{oxo} < 1$ and thus the amount that $q$ and $S_{oxo}$ is out of limits can be used directly to adjust $C_p$ and/or $\Delta t_m$. Thus, the weighted combining circuit 109 computes how much $C_p$ and/or $\Delta t_m$ should be adjusted to satisfy the limit or feasibility tests. However, it has been found advantageous to use an iterative approach for the test of $S_{oxo} < 0.7(1 - S_w)$. To this end, the amplified quantity $S_{oxo} - 0.7(1 - S_w)$ is applied to the output of the combining circuit 109 to cause $C_p$ and/or $\Delta t_m$ to be adjusted by a negative feedback action until $S_{oxo} = 0.7(1 - S_w)$ if $S_{oxo}$ was initially greater than $0.7(1 - S_w)$.

The output of the combining circuit 109 is supplied to the inputs of a pair of analog gates 110 and 111 which are energized by the "vary $\Delta t_m$ command" and "vary $C_p$ command" signals respectively. Considering first the case where $C_p$ is the parameter to be adjusted, the correction signal from gate 111 is supplied to one input of an operational amplifier 112 by way of a combining circuit 113. The output of the operational amplifier 112 controls a servomotor 114 which drives the wiper arm of a potentiometer 115 which wiper arm position is representative of the sonic compaction correction factor $C_p$.

Along with being supplied to other various circuits in FIG. 1 as described earlier, this $C_p$ signal is supplied back to the other input of the operational amplifier 112 by way of a differential amplifier 116. The differential amplifier 116 subtracts a signal proportional to the initial sonic compaction correction factor $C_{p(initial)}$ from the instantaneous value of $C_p$. This signal $C_{p(initial)}$ is derived from the wiper arm of a potentiometer 117 and is set in accordance with the earlier discussed procedure for determining the initial value of $C_p$.

Now concerning the operation of this $C_p$ generating circuit just described, so long as there is no correction signal generated, the actual value of $C_p$ derived from the potentiometer 115 must equal the initial value $C_p$ derived from the potentiometer 117 since the output voltage from differential amplifier 116 must be 0 volts to equal the correction input to the operational amplifier 112 which is now at 0 volts. Thus, so long as no correction is required, the initial value of $C_p$ will also be the actual value of $C_p$ which is generated from the limit testing circuitry of FIG. 5. Now, if a correction signal is generated from combining circuit 109 and $C_p$ is the parameter to be adjusted as determined by the $\Delta t$ versus $\phi_s$ circuit 44, the magnitude of the correction will be supplied to one input of the operational amplifier 112 to cause the wiper arm of potentiometer 115 to adjust itself until both input voltages to the operational amplifier 112 are the same. Thus, the actual value of $C_p$ will now be the initial value of $C_p$ plus the correction thereto.

The $\Delta t_m$ generating circuitry of FIG. 5 operates in exactly the same manner as the $C_p$ generating circuitry and those elements which perform similar functions as the corresponding elements in the $C_p$ generating circuitry have the same numbers followed by an "a." Thus, the operational amplifier 112a performs a similar function for the $\Delta t_m$ circuitry as the operational amplifier 112 performs for the $C_p$ generating circuitry, etc.

As discussed earlier, whenever $C_p$ is being adjusted to make the computed results feasible, $\Delta t_m$ is maintained at a value of 55.6 microsecond per foot ($V_m = 18,000$ feet per second) and whenever $\Delta t_m$ is being adjusted, $C_p$ is maintained at a value of 1.0. To bring about this result, the "vary $C_p$ command" and "-vary $\Delta t_m$ command" signals are utilized to energize a pair of circuits 120 and 121 respectively which act to supply sufficient voltage to the combining circuits 113 and 113a such that when $C_p$ is being adjusted, $\Delta t_m$ will be automatically set at 55.6 and whenever $\Delta t_m$ is being adjusted $C_p$ will be automatically set at 1.0. The circuits 120 and 121 could take the form of, for example, adjustable potentiometers whose output signals are gated by suitable analog gates. (Note that the exact value of this adjustment will be dependent on the initial values of $\Delta t_m$ and $C_p$.)

As stated earlier, valuable information can be obtained by monitoring the adjusted values of $C_p$ and $\Delta t_m$. This is best done by recording $C_p$ until $C_p$ decreases to the value of 1.0 and thereafter recording $\Delta t_m$. To accomplish this, the value of $C_p$ derived from potentiometer 115 is supplied by way of an inhibit gate 122 to the gates and driver amplifier 48 of FIG. 1 as the $C_p$ and $\Delta t_m$ monitor signal. However, whenever $\Delta t_m$ is to be adjusted, as indicated by the "vary $\Delta t_m$ command," the inhibit gate 122 is energized to inhibit $C_p$ and the $\Delta t_m$ value from potentiometer 115a is utilized instead by enabling an enable gate 123.

As discussed earlier, the limit testing circuitry of the present invention places certain preferences on the satisfaction of the various limits to prevent the satisfaction of one limit from interfering with the satisfaction of a more important limit. To accomplish this in accordance with the order of the preference discussed above, the FIG. 5 circuitry acts to neglect those test conditions whose satisfaction would cause a higher order priority test condition to go out of limits, i.e., become unsatisfied. If $q$ should become less than zero, an amplifier and limiter circuit 125 will produce an output signal which acts to discharge or reset the sample and hold amplifier 97 and the sample and hold amplifier 102 by way of an OR-gate 127. These sample and hold amplifiers can only be discharged during the time interval that each amplifier is operative. Thus, the sample and hold amplifiers 95, 97 and 102 each internally include an AND gate (not shown) whose inputs are the discharge signal, designated "DISC" in FIG. 5, and the particular timing control signal to that amplifier so that a coincidence of the two input signals must occur before the sampled voltage can be discharged.

To inhibit the operation of the lowest order condition of $S_{wxo}<0.7(1 - S_{wc})$, the output of OR-gate 127 enables an AND-gate 136 by way of an OR-gate 128 to set a flip-flop 136 by way of an OR-gate 128. This sets a flip-flop 135 so as to disable the AND-gate 134. Since the $t_4$ timing signal is the other input to AND-gate 136 and the complementary output of flip-flop 135 enables AND-gate 134 to allow $t_4$ to open gate 107, it is clear that gate 107 will be closed to keep the output of operational amplifier 105 at zero volts whenever a higher order limit becomes unsatisfied during the time period $t_4$.

Likewise, if $S_{wxo}$ should become less than zero, an amplifier and limiter 30 will produce an output signal which will discharge or reset the sample and hold amplifier 102 during $t_3$ and enable AND-gate 136 by way of the OR-gate 128. If $q$ should become greater then 1, an amplifier and limiter circuit 131 will detect this occurrence and enable AND-gate 136 to set flip-flop 135 by way of the OR-gate 128. After all five timing signals have been generated, the "sample output comand" ($t_5$) signal is generated from timing circuit 103 to energize the gate circuits 48 of FIG. 1. Since the computed signals are not used to update the memory 50 until timing interval $t_5$, the $t_5$ pulse is OR-gated in an OR-gate 137 with the pulse $t_4$ to drive the AND-gate 134 so that the correct values of $C_p$ and/or $\Delta t_m$ will be maintained during the sample output interval $t_5$. The trailing edge of $t_5$ then resets all of the sample and hold amplifiers as well as the flip-flop 135 by way of their AC coupled reset inputs in readiness for another sequence of timing signals. (The $t_5$ reset input of the sample and hold amplifiers is not AND-gated like the discharge signal input.)

It has been found that the limit feasibility tests for $S_{wxo}>0$ and $q<1$ are very seldom not satisfied and could therefore be omitted, if desired. To this end, switches 97a and 102a are located on the output of sample and hold amplifiers 97 and 102 to allow these feasibility tests to be made, or not made, as desired.

Referring to FIGS. 5 and 6A–6C to summarize the operation of the limit testing circuitry of FIG. 5, FIG. 6A shows the timing signals $t_1$–$t_5$ which are utilized to sequentially test the various computed results in the manner previously discussed. Since those limit conditions having the higher priority are tested first, it is clear that whenever one of the lower priority limit tests causes a higher priority limit test to fail, the particular sample and hold amplifier responsive to this lower priority limit test, or flip-flop 135, is reset. Thus, taking an example of this, FIG. 6B shows a signal amplitude corresponding to the computed value of $q$. Comparing FIGS. 6A and 6B, during the sampling interval $t_1$, the value of $q$ is not adjusted since $q$ is already positive. Now, assuming that $S_{wxo}$ is found to be less than zero, the value of $C_p$ and/or $\Delta t_m$ is adjusted during the timing interval $t_2$ and thus the computed value of $q$ will decrease as shown in FIG. 6B.

Now assuming that $S_{oxo}$ is greater then $0.7(1 - S_{wc})$, the operational amplifier 105 of FIG. 5 will generate an output signal thus causing a correction signal to be generated from the combining circuit 109 during the timing interval $t_4$ to change the value of $C_p$ and/or $\Delta t_m$. As sown in FIG. 6B, this last adjustment causes $q$ to become less than zero in this example. Thus, in FIG. 5, the amplifier and limiter circuit 125 will generate an output signal which sets the flip-flop 135. With the flip-flop 135 set, AND-gate 134 becomes disabled to deenergize the gate 107 and render the operational amplifier 105 inoperative. Thus, as shown in FIG. 6B, $q$ will decrease until it becomes negative, at which time it will return to its pre-$t_4$ level.

Referring to FIG. 6C, the value of $q$ that is being recorded, i.e., the value of $q$ that is stored in the buffer memory 50 corresponds to the computed value of $q$ during the last timing sequence. However, when the sampling signal $t_s$, shown in FIG. 6A, is generated to update the buffer memory 50, the recorded value of $q$ will change to the new computed value of $q$ as seen by comparing FIGS. 6A, 6B and 6C. The trailing edge of this sampling signal $t_s$ then resets all of these sample and hold amplifiers and flip-flop 135 in readiness for the next timing sequence. As seen by comparing FIGS. 6A and 6B, the computed value of $q$ will change correspondingly after this reset. However, the buffer memory 50 has already been updated and will not be responsive to this last change after reset. Then, at a later time, the sampling sequence begins again and the same operation is performed over and over again. At the second $t_1$ timing interval of FIG. 6A, it is seen that the computed value of $q$ is less than 0 and thus, during this second $t_1$ time interval, either $C_p$ or $\Delta t_m$ will be adjusted until $q$ is equal to zero.

The sampling signal $t_s$ is also utilized to gate a gated voltage sensitive trigger 133 (FIG. 5) which is responsive to the computed value of $q$ to generate an output signal if the computed value of $q$ is greater than the predetermined critical value of $q$ supplied by a suitable potentiometer 129. (As stated earlier, the particular model utilized here does not conform to extremely shaly formations and thus the recorded logs are cut off whenever $q$ exceeds the critical level.) This $q > q_{critical}$ signal can then be utilized to discharge the buffer memory 50 of FIG. 1 to zero provided a switch 133a on the output of trigger 133 is closed.

Now turning to FIGS. 7A and 7B, there is shown another embodiment of how the method of the present invention can be carried out. (One complete picture of FIG. 7 can be obtained by placing FIG. 7A above FIG. 7B, both of which are longitudinally positioned relative to one another.) More particularly, FIG. 7 is a generalized flow diagram which can be utilized to program a general purpose digital computer such as, for example, the EMR 6050 Computer manufactured by Electromechanical Research, Inc.

In FIGS. 7A and 7B, the first step is to calculate values of $\phi_s$, $\phi_D$, $\phi_N$ and the SP reduction factor in response to $\Delta t$, $\rho_B$, $C_N$, and SP as well as all of the previously discussed constants so that a first pass can be made through all of the data to search for the values of $C_{p(initial)}$, $\Delta t_{m(initial)}$ and $R_w$ (as well as $R_c$ which can be assumed to be $10R_w$). This is illustrated in FIG. 7A by placing a sense switch 141 in its proper state. Once these initial values are obtained, the data is run through the computer again with the sense switch 141 in its other state for performing the required calculations of $q$, $S_{gxo}$, etc.

Initially, the critical discrimination functions ($\alpha > \alpha_{CRT}$, GR $<$ GR$_{CRT}$, and CAL $<$ CAL$_{CRT}$) are taken care of as represented by the box 143. If the critical discrimination test is passed, the next step is to calculate $q$, $\phi_z$, $\phi_e$, $S_{gxo}$ and $S_{wxo}$ in response to $\phi_s$, $\phi_N$, $\phi_D$ and $C_p$ as represented by the box 144. Then, the first three limit or feasibility tests are made, namely, $0 < q < 1$ and $S_{gxo} < 1$, as represented by the boxes 145, 147 and 148. In each case, if the limit test is not satisfied, the program instructs the computer to determine whether to adjust $C_p$ or $\Delta t_m$, and how much, in response to $\phi_s$ and $\Delta t$ as well as the particular parameter that is being tested, as represented by the boxes 149, 151 and 152 respectively. Each time $C_p$ and/or $\Delta t_m$ is adjusted, the program instructs the computer to recalculate $\phi_s$ as represented by the box 164. Also, of course, the values of $q$, $\phi_z$, $\phi_e$, $S_{gxo}$ and $S_{wxo}$ are recalculated each time a change in $C_p$ and/or $\Delta t_m$ is made. For the $S_{wxo} < 0$, and $q > 1$ tests, the program instructs the computer to determine if a required adjustment will make a higher priority parameter fail its test and, if so, the adjustment is not made. This feature is represented by the boxes 154 and 155. The feasibility tests for $S_{wxo} < 0$ and $q > 1$ can be bypassed as represented by the sense switches 150 and 153.

Next, the program instructs the computer to calculate the value of $S_w$ and $1 - S_w$ in response to $R_t$, $q$, $F_z$, $R_w$ and $R_c$ as represented by the box 156. Then, the test is made to determine if $S_{gxo} > 0.7(1 - S_w)$ as represented by the box 157 and if the answer is yes, the program instructs the computer to determine whether to adjust $C_p$ and/or $\Delta t_m$ in response to $\phi_s$ and $\Delta t$. If an adjustment is to be made, the program instructs the computer to adjust $C_p$ and/or $\Delta t_m$ to make $S_{gxo} = 0.7(1 - S_w)$ as represented by the box 158. This adjustment is iterative and thus $C_p$ and/or $\Delta t_m$ is adjusted a step at a time until $S_{gxo}$ is equal to $0.7(1 - S_w)$. After each step of adjustment the program instructs the computer to determine if the adjustment of $C_p$ or $\Delta t_m$ makes one of the high order parameters fail its test as represented by the box 159. If so, $S_{gxo}$ is returned to its initial value.

At this point, the values of $q$, $\phi_z$, $\phi_e$, $S_{gxo}$ and $C_p$ correspond to the final computed values thereof. Then, the value of $S_w\phi_e$ is computed from these final computed results as represented by the box 160. If $q$ is less than $q_{critical}$, which function is represented by the diamond shaped box 161, the program instructs the computer to read out the computed values to a playback tape 162 or to tabulate the data, which function is represented by the box 163, or alternatively both readouts can be utilized. This $q < q_{CRT}$ test can be bypassed as represented by the sense switch 165.

Referring now to FIG. 8, there is shown a typical log of the curves which could be obtained in typical formations when utilizing the methods of the present invention. Tracks 1 and 2 show the SP and resistivity logs respectively. The computed shale percentage $q$ and effective porosity $\phi_e$ are recorded on track 3. The scales of track 3 are chosen such that a visual estimate of shaliness and its effect on permeability can be ascertained. More particularly, it is known that a low clay content $q$ and high effect porosity $\phi_e$ suggest good permeability but an increased clay content and decreased effective porosity suggest lower permeability. It has been found that when $q$ is greater than $2\phi_e$, permeability is generally too low for production. Thus, by choosing a scale such that $q$ is twice as great as $\phi_e$, the crossing of the two curves will indicate permeability too low for production.

The computed values of water saturation $S_w$, invaded zone gas saturation $S_{gxo}$ and the sonic compaction correction factor $C_p$ are shown recorded in track 4. As mentioned previously, when $S_{gxo}$ is approximately one-half or more the value of $1 - S_w$, the formation is probably gas bearing and if $S_{gxo}$ is appreciably less than $1 - S_w$, the zone probably contains oil rather than gas. Thus, by choosing the scales for $S_w$ and $S_{gxo}$ such that they increase in opposite directions on track 4, a mere glance at the $S_{gxo}$ and $S_w$ curves will give a quick indication whether gas or oil is present in a formation. Also presented on the track 4 is the $C_p$ and $\Delta t_m$ monitor curve. As stated earlier, since $C_p$ cannot be less than 1.0, whenever the curve falls below 1.0, it is known that $\Delta t_m$ is being recorded. From the $C_p$ and $\Delta t_m$ monitor curve, a zone of higher than normal or trend pressure will be indicated by an increase of $C_p$ over the established trend, and conversely, a value of $C_p$ lower than the trend would normally indicate low formation pressure. Also, rapid fluctuations by $C_p$ and/or $\Delta t_m$ would indicate invalid sonic readings.

The values of $\phi_z$, $\phi_e$ and $S_w\phi_e$ are recorded in track 5 to provide a porosity analysis as a percentage of bulk volume. The highest reading curve, $\phi_z$, indicates the total porosity including both fluids and clay. The middle curve $\phi_e$ indicates the fluid-filled porosity and thus the difference between $\phi_z$ and $\phi_e$ represents the bulk volume clay fraction. The lowest curve $S_w\phi_e$ represents the percent of formation bulk volume filled with formation water and thus the difference between $\phi_e$ and $S_w\phi_e$ indicates bulk volume hydrocarbons.

As stated earlier, whenever the SP log indicates extreme shaliness, which is the case when the log reaches its most positive deflection, the computed values are no longer recorded. This situation is found in FIG. 8 at various depth intervals, as for example, 8540 to 8590 feet. It will also be recalled that if the value of $R_t$ becomes very high, the SP cutoff is ignored since it is probably the presence of hydrocarbons that is causing the reduced SP deflection. This occurrence can be seen at several depth intervals on the logs, e.g., around 8630 to 8640 feet.

It can thus be seen that by utilization of the techniques of the present invention, an accurate determination of various valuable formation conditions can be obtained even when the formations are shaly sands filled with gas. In the discussion up to this point, these desired results have been obtained through the use of three porosity logs. However, it is many times the case that only two porosity logs are available for any given borehole. When only two porosity logs are available, it is clear that there will be three equations and four unknowns, which produces a difficult situation. To circumvent this problem, in accordance with the present invention, one of the unknown parameters is assumed to be constant as a first assumption. Then, certain limit or feasibility tests are made on the other computed results and if those results are not feasible, the value of the assumed parameter is altered to make the solution feasible.

First concerning the case where only the density and neutron porosity logs are available, it is clear that only equations (8), (9) and (11) can be utilized in the matrix solution. In many cases, the total porosity $\phi_z$ has been found to be relatively constant and predictable. Thus, as a first approximation, it can be assumed that $\phi_z$ has a constant value. This initial $\phi_z$ value can be obtained in a nearby water sand from the neutron log since this device gives an accurate reading of total porosity $\phi_z$ in water sands. Alternatively, equations (8) and (9) can be combined to provide the following equation for $\phi_z$ in clean ($q=0$) gas sands:

$$\phi_z = \phi_e = \phi_N + 1.4\phi_D/2.4 \qquad (16)$$

In most cases, clean gas sands are readily apparent on the logs since they are characterized by high resistivities and large differences between $\phi_D$ and $\phi_N$.

Then, with $\phi_z$ determined by one of the two above methods, equations (8), (9) and (11) can be solved to provide computed values of $S_{gxo}$, q and $\phi_e$. If the assumed value of $\phi_z$ is too small, the computed value of q will be too small, usually negative. Thus, by increasing $\phi_z$ until $q=0$ if q is less than 0, a more feasible value of both q and $\phi_z$ can be obtained. On the other hand, if the assumed value of $\phi_z$ is too large, $S_{gxo}$ is probably too high. Then, $\phi_z$ can be reduced until $S_{gxo}$ is equal to 0.7(1−bhw). The various criticality test discussed earlier can be carried out in the same manner as before.

Now referring to FIG. 9, there is shown apparatus for carrying out the above method. The derivation of the neutron and density derived porosity values $\phi_N$ and $\phi_D$ is the same as shown and described in FIG. 1 and need not be discussed further. The gated values of $\phi_D$ and $\phi_N$ are supplied to a matrix computer 170 along with a signal proportional to the total porosity $\phi_z$ derived from a limit testing circuit 172. The matrix computer 170 can be arranged in a suitable manner to solve equations (8), (9) and (11) in a similar manner to that discussed in FIG. 4 and thus need not be discussed further.

The computed values of $\phi_e$, $S_{gxo}$, $S_{wxo}$ and q are supplied from the matrix computer 170 to the limit testing circuitry 172 which can be arranged in the same manner as shown in FIG. 5 except, in this case, $\phi_z$ is varied instead of $C_p$ or $\Delta t_m$. Thus, the "vary $\Delta t_m$ command" and "vary $C_p$ command" signals and corresponding gating circuits are not necessary in the limit testing circuitry 172 of FIG. 9. Additionally, only one potentiometer feedback loop is necessary in the limit testing circuitry 172 for producing a signal representative of $\phi_z$. The limit testing circuitry 172 thus acts to satisfy the same limits as discussed in connection with FIGS. 1 and 7 and adjusts $\phi_z$ to satisfy these limits.

An $S_w$ computer 173 is responsive to the gated value of $R_t$, along with values of $R_e$, $R_w$, q and $\phi_z$ to compute $S_w$ and $1-S_w$ in the same manner as in FIG. 4. The $1-S_w$ signal is then supplied to the limit testing circuitry 172 for comparison with $S_{gxo}$ in the same manner as in FIGS. 1 and 5. As in FIGS. 1 and 5 the limit testing circuitry 172 generates a sample output command signal for energizing the gating and memory circuit 174 so as to supply the computed results to a recorder 175. The quantity $S_w\phi_e$ is derived from a multiplication circuit 176 in the same manner as before.

Now referring to FIGS. 10A and 10B, there is shown a generalized flow diagram of how the above-described two porosity interpretation technique can be carried out by appropriately programming a general purpose digital computer (FIG. 10A is longitudinally positioned above FIG. 10B, the same as with FIGS. 7A and 7B.) The FIGS. 10A and 10B flow diagram is similar in many respects to the FIGS. 7A and 7B flow diagram. Thus, the various function boxes of FIGS. 10A and 10B have the same numbers as the boxes in FIGS. 7A and 7B which perform the same functions with only the addition of an "a" after the numbers in FIGS. 10A and 10B. Thus, it is only necessary to discuss the differences of the FIGS. 10A and 10B flow diagram from the FIGS. 7A and 7B flow diagram. Concerning these differences, the function box 104a calculates $\phi_N$, $\phi_D$ and instead of $\phi_s$, $\phi_D$, $\phi_N$ and $\alpha$. The function box 142a indicates that during the first pass, a search for $R_w$ and $\phi_{z(initial)}$ is made instead of the FIG. 7 search for $R_w$, $C_{p(initial)}$, and $\Delta t_{m(initial)}$. The box 144a indicates that the quantity $\phi_z$ is not an output function, but is used instead as an input. The limit testing boxes 149a–155a, 158a and 159a indicate that $\phi_z$ is the parameter to be adjusted instead of $C_p$ or $\Delta t_m$. It should also be noted that the "recalculate $\phi_s$," box 164 in FIG. 7A is missing in FIGS. 10A and 10B, as expected, since the sonic log is not used in FIGS. 10A and 10B.

It is also many times the case that only sonic and density data is available, again giving rise to three equations and four unknowns. However, if the hydrocarbon effect on the sonic and density logs is ignored, it can be seen from equations (7) and (8) that $\phi_s$ and $\phi_D$ can be rewritten as:

$$\phi_s = \phi_e + q\phi_e = \phi_z \text{ and} \qquad (17)$$
$$\phi_D = \phi_e. \qquad (18)$$

Thus, sonic derived porosity $\phi_s$ can be used as the total porosity $\phi_z$ parameter and the value of $\phi_D$ is used as the effective porosity $\phi_e$ parameter. The shale percentage q can then be calculated from equations (17) and (18).

However, it has been found in some cases that values of $\phi_D$ come out to be larger than $\phi_s$, which leads to negative values of q, which is a nonfeasible solution. When this happens there are several possible explanations, one of which is that too large of a value of $C_p$ may have been used to correct the sonic porosity value for lack of compaction. When this happens, $C_p$ can be reduced until $\phi_s = \phi_D$ which results in $q = 0$. As an alternative explanation, gas or light oil may have increased $\phi_D$ without correspondingly increasing $\phi_s$. Again, $C_p$ or $\Delta t_m$ can be adjusted to make $q=0$.

To implement the above method utilizing sonic and density data, the same apparatus utilized in FIGS. 1, 2, 3, 4 and 5 can be utilized with only minor variations, namely, matrix computer 33 will of course be different and much simpler in construction and the only limit tests to be made are q less than 0 and greater than 1. The adjustment of either $C_p$ or $\Delta t_m$ will take place in the same manner as shown and described in FIG. 5. Likewise, a general purpose digital computer could be programmed to perform this method in much the same manner as represented by the flow diagram of FIGS. 7A and 7B. The only differences would be the absence of the neutron derived porosity values and the absence of all of the limit tests except q less than 0 and greater than 1. Everything else would be essentially the same and thus it is not necessary to go into further detail on this method.

When the only porosity data available is from the sonic and density logs, it can also be assumed that the formations are clean or nonshaly ($q = 0$). In this event, equations (7) and (11) can be rewritten as:

$$\phi_s = \phi_e + (C_p - 1) \phi_e S_{gxo} \qquad (19)$$
$$\phi_z = \phi_e \qquad (20)$$

Equation (8) for $\phi_D$ would be the same in this case since q is not a factor in equation (8).

Equations (8), (19) and (20) could be solved by an appropriate matrix computer, like the one shown in FIG. 3 and computed values of $\phi_e$ (and thus $\phi_z$), and $S_{xo}$ could be obtained. If desired, the limit tests for $0 < S_{wxo}$ and $S_{gxo} < 0.7(1 - S_{xc})$ could then be carried out and $C_p$ and/or $\Delta t_m$ adjusted as before to produce the desired solutions. Since the apparatus for performing this method would be very similar to the earlier described apparatus, it is not necessary to go into further detail on such apparatus.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of machine processing well logging data derived from exploring devices which investigate earth formations traversed by a borehole, comprising:
   deriving first porosity measurements functionally related to formation hydrogen content along a section of a borehole traversing earth formations;
   deriving second measurements functionally related to formation bulk density along the section of a borehole;
   deriving third measurements functionally related to the resistivity of the formation along the borehole section;
   combining said first, second and third measurements to produce output representations functionally related to one or more formation parameters including the shale or clay content, porosity, or water or hydrocarbon saturation of the formation;
   comparing one or more of said output representations with each other or predetermined limit values to determine feasibility of said compared output representations; and
   computing new values for one or more of said shale or clay content, porosity, or water or hydrocarbon saturation if said compared output representations are not feasible.

2. The method of claim 1 wherein the steps of comparing and computing include the steps of comparing said output representations related to clay content and water saturation with predetermined limit values to determine feasibility, and computing new values of at least some of the parameters given by said output representations if any of said compared output representations are not feasible.

3. A method of machine processing well logging data derived from exploring devices which investigate earth formations traversed by a borehole, comprising:
   deriving first porosity measurements functionally related to formation hydrogen content along a section of a borehole traversing earth formations;
   deriving second measurements functionally related to formation bulk density along the section of a borehole;
   combining said first and second measurements to produce indications of formation clay content and formation gas saturation along the section of a borehole, each of said indications being functionally related to both of said first and second measurements;
   deriving third measurements along a section of a borehole of one ore more of the spontaneous naturally occurring potential of a formation, the natural radioactivity of a formation, or the diameter of a borehole;
   detecting if a third measurement exceeds a given limit; and
   inhibiting the combination of said first and second measurements if said third measurement exceeds said given limit.

4. A method of machine processing well logging data derived from exploring devices which investigate earth formations traversed by a borehole, comprising:
   deriving first porosity measurements functionally related to formation hydrogen content along a section of a borehole traversing earth formations;
   deriving second measurements functionally related to formation bulk density along the section of a borehole;
   combining said first and second measurements to produce indications of formation clay content and formation gas saturation along the section of a borehole, each of said indications being functionally related to both of said first and second measurements;
   deriving third measurements along a section of a borehole of the spontaneous naturally occurring potential of the formations traversed by the borehole;
   deriving fourth measurements along a section of a borehole of the electrical resistivity of the formations traversed by the well bore;
   detecting if a third measurement exceeds a first limit;
   detecting if a fourth measurement exceeds a second limit; and
   inhibiting the combination of said first and second measurements in response to a third measurement exceeding said first limit unless a fourth measurement exceeds said second limit.

5. A method of machine processing well logging data derived from exploring devices which investigate earth formations traversed by a borehole, comprising:
   deriving first porosity measurements $\phi_N$ functionally related to the formation hydrogen content along a section of a borehole traversing earth formations;
   deriving second measurements $\phi_D$ functionally related to the formation bulk density along a section of a borehole; and
   combining said first and second measurements to provide values of formation clay content $q$, formation gas saturation $S_{gxo}$, and effective nonclay filled porosity $\phi_e$ along a section of a borehole in accordance with the relationships:

$$\phi_D = \phi_e + 0.5\phi_e S_{gxo},$$
$$\phi_N = \phi_e + q\phi_z - 0.7\phi_e S_{gxo}, \text{ and}$$
$$\phi_e = \phi_z(1-q), \text{ and}$$

wherein the total formation porosity $\phi_z$ is a predetermined parameter.

6. A method of machine processing well logging data derived from exploring devices which investigate earth formations traversed by a borehole, comprising:
   deriving a first porosity measurement functionally related to formation hydrogen content at a selected borehole depth level;
   deriving a second porosity measurement functionally related to formation bulk density at the selected depth level;
   providing an indication of the total porosity of formations at the selected depth level, said total porosity indication being an assumed value ascertained from said first and second measurements taken at selected formation depth levels;
   combining said total porosity indication with said first and second measurements to produce an indication of the formation clay content at the selected depth level;
   testing said clay content indication to determine if said clay content indication is within a given limit; and
   adjusting said total porosity indication if said clay content indication is outside of said given limit and recombining said adjusted total porosity indication with said first and second measurements to produce a new and more accurate indication of formation clay content at the selected depth level.

7. A method of machine processing well logging data derived from exploring devices which investigate earth formations traversed by a borehole, comprising:
   deriving a first porosity measurement functionally related to formation hydrogen content at a selected borehole depth level;
   deriving a second porosity measurement functionally related to formation bulk density at the selected depth level;
   providing an indication of the total porosity of a formation at the selected depth level, said total porosity indication being an assumed value ascertained from said first and second measurements taken at various formation depth levels;

combining said total porosity indication with said first and second measurements to produce indications of the gas saturation in a zone near a borehole, and formation clay content at the selected depth level, each of said indications being functionally related to both of said derived measurements;

deriving a third measurement representative of the electrical resistivity of a formation zone radially spaced from a borehole at the selected depth level;

combining said third measurement with said clay content and total porosity indications to produce an indication of hydrocarbon saturation in said formation zone radially spaced from a borehole at the selected depth level;

comparing said gas and hydrocarbon indications to determine if said gas saturation indication is greater than a given percentage of said hydrocarbon saturation indication; and adjusting said total porosity indication if said gas saturation indication is outside of said given percentage limit and recombining said adjusted total porosity indication with said first, second and third measurements to produce new indications of formation clay content, and hydrocarbon and gas saturation at the selected depth level.

8. A method of machine processing well logging data derived from exploring devices which investigate earth formations traversed by a borehole, comprising:

deriving a first porosity measurement functionally related to formation hydrogen content at a selected borehole depth level;

deriving a second porosity measurement functionally related to formation bulk density at the selected depth level;

combining said first and second measurements to produce indications of formation gas saturation in a zone near a borehole, and formation clay content at the selected depth level, each of said indications being functionally related to both of said derived measurements;

deriving a third measurement representative of the electrical resistivity of a formation zone radially spaced from a borehole at the selected depth level;

combining said third measurement with said clay content indication to produce an indication of formation hydrocarbon saturation in a zone radially spaced from a borehole; and recording said gas and hydrocarbon saturation indications whereby the relationship of said gas and hydrocarbon indications to one another is indicative of the presence of oil or gas in a formation at the selected depth level.

9. A method of machine processing well logging data derived from exploring devices which investigate earth formations traversed by a borehole, comprising:

deriving a first porosity measurement functionally related to formation hydrogen content at a selected borehole depth level;

deriving a second porosity measurement functionally related to formation bulk density at the selected depth level;

providing an indication of the total porosity of a formation, said total porosity indication being an assumed value ascertained from said first and second measurements taken at selected formation depth levels;

combining said total porosity indication with said first and second measurements to produce indications of formation clay content and the effective nonclay filled porosity of a formation at the selected depth level, each of said clay content and effective porosity indications being functionally related to both of said derived measurements and said total porosity indication;

testing said clay content indication to determine if said clay content indication is within a given limit;

adjusting said total porosity indication if said clay content indication is outside of said given limit and recombining said adjusted total porosity indication with said first and second measurements to produce a new indication of formation clay content at the selected depth level;

deriving a third measurement representative of the electrical resistivity of a formation at the selected depth level;

combining said third measurement with said adjusted total porosity indication, said new clay content indication, and said effective porosity indication to produce an indication of the amount of bulk volume formation filled with water at the selected depth level; and recording said total porosity, effective porosity, and bulk volume water indications on a record medium to produce logs thereof whereby the separation between said total and effective porosity logs is indicative of bulk volume clay content and the separation between said effective porosity and bulk volume water logs is indicative of bulk volume hydrocarbons at the selected depth level.

10. A method of machine processing well logging data derived from exploring devices which investigate earth formations traversed by a borehole, comprising:

deriving a first porosity measurement functionally related to formation hydrogen content at a selected borehole depth level;

deriving a second porosity measurement functionally related to formation bulk density at the selected depth level;

providing an indication of the total porosity of a formation, said total porosity indication being an assumed value ascertained from said first and second measurements taken at selected formation depth levels;

combining the total porosity indication with said first and second measurements to produce indications of formation clay content, formation gas saturation in a zone near a borehole, and the effective, nonclay filled porosity of a formation at the selected depth level, each of said clay content, gas saturation, and effective porosity indications being functionally related to said derived measurements and said total porosity indication;

testing said clay content and gas saturation indications to determine if said clay content and gas saturation indications are within given limits;

adjusting said total porosity indication if said clay content and gas saturation indications are outside of said given limits and recombining said adjusted total porosity indication with said first and second measurements to produce new indications of formation clay content and gas saturation at the selected depth level;

deriving a third measurement representative of the electrical resistivity of a formation zone radially spaced from a borehole at the selected depth level;

combining said third measurement with said adjusted total porosity indication and said new clay content indication to produce indications of formation water and hydrocarbon saturation in said radially spaced formation zone at the selected depth level;

combining said formation effective porosity and water saturation indications to give an indication of the amount of bulk volume formation filled with water at the selected depth level;

recording said total porosity, effective porosity, bulk volume water indications on one track of a record medium to produce logs thereof whereby the separation between said total and effective porosity logs is indicative of bulk volume clay content at the selected depth level and the separation between said effective porosity and bulk volume water logs is indicative of bulk volume hydrocarbon content at the selected depth level; and recording said gas and hydrocarbon saturation indications on one track of a record medium to produce logs thereof whereby a comparison of said gas and hydrocarbon saturation logs will provide information as to whether a formation at the selected depth level contains gas or oil.

11. A method of machine processing well logging data derived from exploring devices which investigate earth formations traversed by a borehole, comprising:

deriving first porosity measurements $\phi_t$ functionally related to formation acoustic travel time along a section of a borehole traversing earth formations;

deriving second porosity measurements $\phi_D$ functionally related to formation bulk density along a section of a borehole; and combining said first and second measurements to produce indications of formation gas saturation $S_{gxo}$ and the effective, nonclay filled formation porosity $\phi_e$ along a section of a borehole in accordance with the relationships:

$$\phi_s = \phi_e + (C_p - 1) \phi_e S_{gxo},$$
$$\phi_D = \phi_e + 0.5 \phi_e S_{gxo},$$

and wherein the formation compaction factor $C_p$ is a predetermined parameter.

12. A method of machine processing well logging data derived from exploring devices which investigate earth formations traversed by a borehole, comprising:

deriving a first measurement representative of formation acoustic travel time at a selected borehole depth level;

providing an indication of a formation compaction factor representative of the compactness of a formation at the selected depth level;

combining said first measurement with said compaction factor indication to produce an indication of acoustic travel time derived porosity at the selected depth level;

deriving a second porosity measurement functionally related to formation bulk density at the selected depth level;

combining said acoustic travel time derived porosity indication with said second measurement to produce an indication of formation clay content at the selected depth level;

testing said clay content indication to determine if said clay content indication is within a given limit; and adjusting said compaction factor indication if said clay content indication is outside of said given limit and recombining said second measurement with said adjusted compaction factor indication and acoustic travel time measurement to produce a new indication of clay content at the selected depth level.

13. The method of claim 12 and further including the steps of:

deriving a third measurement of one or more of the spontaneous naturally occurring potential of a formation, the natural radioactivity of a formation, or the diameter of a borehole at the selected depth level;

detecting if said third measurement exceeds a given limit; and inhibiting the combination of said acoustic travel time derived porosity indication with said first and second measurements in response to said third measurement exceeding said given limit.

14. The method of claim 12 and further including the steps of:

deriving a third measurement of the spontaneous naturally occurring potential of a formation at the selected depth level;

deriving a fourth measurement of the electrical resistivity of a formation at the selected depth level;

detecting if said third and fourth measurements exceed given limits; and inhibiting the combination of said acoustic travel time derived indication with said first and second measurements in response to said third measurement exceeding its given limit unless said fourth measurement exceeds its given limit.

15. A method of machine processing well logging data derived from exploring devices which investigate earth formations traversed by a borehole, comprising:

deriving a first measurement representative of formation acoustic travel time at a selected borehole depth level;

providing indications of a formation compaction factor representative of the compactness of a formation at the selected depth level and the acoustic matrix travel time of the solid material of a formation at the selected depth level, said compaction factor and matrix travel time indications being ascertained from well logging data measured at selected formation depth levels;

combining said first measurement with said compaction factor indication to produce an indication of acoustic travel time derived porosity at the selected depth level;

deriving a second porosity measurement functionally related to formation bulk density at the selected depth level;

combining said acoustic travel time derived porosity indication with said second measurement to produce an indication of formation clay content at the selected depth level;

testing said clay content indication to determine if said clay content indication is within a given limit; and adjusting one of said compaction factor or matrix travel time indications if said clay content indication is outside of said given limit, said compaction factor indication being adjusted until exceeding a given limit at which time said matrix travel time indication is adjusted, and recombining said adjusted compaction factor or matrix travel time indications with said acoustic travel time measurement to produce a new acoustic travel time derived porosity indication for recombination with said second measurement to produce a new indication of clay content at the selected depth level.

16. A method of machine processing well logging data derived from exploring devices which investigate earth formations traversed by a borehole, comprising:

deriving a first measurement representative of formation acoustic travel time at a selected borehole depth level;

providing an indication of a formation compaction factor representative of the compactness of a formation at the selected depth level;

combining said first measurement with said compaction factor indication to produce an indication of acoustic travel time derived porosity at the selected depth level;

deriving a second porosity measurement functionally related to formation bulk density at the selected depth level;

combining said acoustic travel time derived porosity indication with said second measurement to produce indications of formation clay content, total formation porosity, and effective nonclay filled formation porosity at the selected depth level, each of said clay content, total and effective porosity indications being functionally related to said acoustic porosity indication and second porosity measurement;

testing said clay content indication to determine if said clay content indication is within a given limit;

adjusting said compaction factor indication if said clay content indication is outside of said given limit and recombining said second measurement with said adjusted compaction factor indication and acoustic travel time measurement to produce new indications of clay content, total and effective porosity at the selected depth level;

deriving a third measurement representative of the electrical resistivity of a formation at the selected depth level;

combining said third measurement with said new indications of clay content, total and effective porosity to produce an indication of that portion of the formation bulk volume filled with water at the selected depth level; and recording said bulk volume water and total and effective porosity indications on a record medium to produce logs thereof whereby the separation between said total and effective porosity logs is indicative of bulk volume clay content and the separation between the effective porosity and bulk volume water logs is indicative of bulk volume hydrocarbon content.

17. A method of machine processing well logging data derived from exploring devices which investigate earth formations traversed by a borehole, comprising:

deriving a first measurement representative of formation acoustic travel time at a selected borehole depth level;

providing an indication of a formation compaction factor representative of the compactness of a formation at the selected depth level;

combining said first measurement with said compaction factor indication to produce an indication of acoustic travel time derived porosity at the selected depth level;
deriving a second porosity measurement functionally related to formation bulk density at the selected depth level;
combining said acoustic travel time derived porosity indication with said second measurement to produce an indication of formation gas saturation at the selected depth level;
testing said gas saturation indication to determine if said gas saturation indication is within a given limit; and
adjusting said compaction factor indication if said gas saturation indication is outside of said given limit and recombining said second measurement with said adjusted compaction factor indication and acoustic travel time measurement to produce a new indication of gas saturation at the selected depth level.

18. A method of machine processing well logging data derived from exploring devices which investigate earth formations traversed by a borehole, comprising:
deriving a first measurement representative of formation acoustic travel time at a selected borehole depth level;
providing indications of a formation compaction factor representative of the compactness of a formation and the acoustic matrix travel time of the solid material of a formation at the selected depth level, said compaction factor and matrix travel time indications being ascertained from well logging data measured at selected formation depth levels;
combining said first measurement with said compaction factor indication to produce an indication of acoustic travel time derived porosity at the selected depth level;
deriving a second porosity measurement functionally related to formation bulk density at the selected depth level;
combining said acoustic travel time derived porosity indication with said second measurement to produce an indication of formation gas saturation at the selected depth level;
testing said gas saturation indication to determine if said gas saturation indication is within a given limit; and
adjusting one of said compaction factor or matrix travel time indications if said gas saturation indication is outside of said given limit, said compaction factor indication being adjusted until exceeding a given limit at which time said matrix travel time indication is adjusted, and recombining said adjusted compaction factor or matrix travel time indications with said acoustic travel time measurement to produce a new acoustic travel time derived porosity indication for recombination with said second measurement to produce a new indication of gas saturation at the selected depth level.

19. A method of machine processing well logging data derived from exploring devices which investigate earth formations traversed by a borehole, comprising:
deriving a first measurement representative of formation acoustic travel time at a selected borehole depth level;
providing indications of a formation compaction factor representative of the compactness of a formation and the acoustic matrix travel time of the solid material of a formation at the selected depth level, said compaction factor and matrix travel time indications being ascertained from well logging data measured at selected formation depth levels;
combining said first measurement with said compaction factor indication to produce an indication of acoustic travel time derived porosity at the selected depth level;
deriving a second porosity measurement functionally related to formation bulk density at the selected depth level;
combining said acoustic travel time derived porosity indication with said second measurement to produce indications of formation gas saturation in a zone close to a borehole and total formation porosity at the selected depth levels, each of said gas saturation and total porosity indications being functionally related to said acoustic porosity indication and second measurement;
testing said gas saturation indication to determine if said gas saturation indication is within a given limit;
adjusting one of said compaction factor or matrix travel time indications if said gas saturation indication is outside of said given limit, said compaction factor indication being adjusted until exceeding a given limit at which time said matrix travel time indication is adjusted, and recombining said adjusted compaction factor or matrix travel time indications with said acoustic travel time measurement to produce a new acoustic travel time derived porosity indication for recombination with said second measurement to produce new indications of gas saturation and total porosity at the selected depth level;
deriving a third measurement of the electrical resistivity of a zone radially spaced from a borehole at the selected depth level;
combining said third measurement with said new total porosity indication to provide an indication of the hydrocarbon saturation in said zone radially spaced from a borehole at the selected depth level; and
recording said gas and hydrocarbon saturation indications on a record medium to produce logs thereof whereby a comparison of said two logs will indicate the presence of gas or oil in a formation.

20. A method of machine processing well logging data derived from exploring devices which investigate earth formations traversed by a borehole, comprising:
deriving a first measurement representative of formation acoustic travel time at a selected borehole depth level;
providing an indication of a formation compaction factor representative of the compactness of a formation at the selected depth level;
combining said first measurement with said compaction factor indication to produce an indication of acoustic travel time derived porosity at the selected depth level;
deriving a second porosity measurement functionally related to formation bulk density at the selected depth level;
combining said acoustic travel time derived porosity indication with said second measurement to produce indications of formation gas saturation in a zone close to a borehole, and total formation porosity at the selected depth level, each of said gas saturation and total porosity indications being functionally related to said acoustic porosity indication and second measurement;
deriving a third measurement of the electrical resistivity of a formation zone radially spaced from a borehole at the selected depth level;
combining said third measurement with said total porosity indication to produce an indication of hydrocarbon saturation in said zone radially spaced from a borehole at the selected depth level;
comparing said gas saturation indication with said hydrocarbon saturation indication to determine if said gas saturation indication is greater than a given percentage of said hydrocarbon saturation indication; and
adjusting said compaction factor indication if said gas saturation indication is greater than said given percentage and recombining said second measurement with said adjusted compaction factor indication and said acoustic travel time measurement to produce a new gas saturation indication and a new total porosity indication for recombination with said third measurement to produce a new indication of hydrocarbon saturation at the selected depth level.

21. A method of machine processing well logging data derived from exploring devices which investigate earth formations traversed by a borehole, comprising:

deriving first porosity measurements $\phi_N$ functionally related to formation hydrogen content along a section of a borehole traversing earth formations;

deriving second porosity measurements $\phi_D$ functionally related to formation bulk density along a section of a borehole;

deriving third porosity measurements functionally related to the acoustic travel time of a formation along a section of a borehole; and combining said first, second, and third measurements to produce output representations of one or more of formation clay content $q$, formation effective porosity $\phi_e$ or formation hydrocarbon saturation $S_{hy}$ along a section of a borehole, said first and second porosity measurements being combined in accordance with the following:

$$\phi_N = f(\phi_e, q, \phi \, S_{hy})$$
$$\phi_D = f(\phi_e, \phi_e S_{hy})$$

where $f$ signifies a functional relationship.

22. The method of claim 21 wherein the step of combining measurements includes combining said measurements in accordance with the following:

$$\phi_N = \phi_e + q\phi_z - a\phi_e S_{hy}$$
$$\phi_D = \phi_e + b\phi_e S_{hy}$$

where $\phi_z$ is total formation porosity and $a$ and $b$ are predetermined constants.

23. The method of claim 21 wherein said hydrocarbon saturation is invaded zone gas saturation $S_{gxo}$ and the step of combining measurements includes combining said measurements in accordance with the following:

$$\phi_N = \phi_e + q\phi_z - a\phi_e S_{gxo}$$
$$\phi_D = \phi_e + b\phi_e S_{gxo}$$

where $\phi_z$ is total formation porosity and $a$ and $b$ are predetermined constants.

24. The method of claim 21 and further including the steps of deriving measurements functionally related to the resistivity of a selected portion of the formation over the borehole section, combining said resistivity measurements with said output representations of clay content to produce output representations of the formation water or hydrocarbon saturation, and recording one or more of said output representations as a function of the borehole depth at which said measurements were derived.

25. The method of claim 21 and further including the steps of deriving measurements functionally related to the resistivity of a selected portion of the formation over the borehole section, combining said resistivity measurements with said output representations of clay content to produce output representations of the formation water or hydrocarbon saturation, comparing one or more of said output representations with each other or with limit values to determine feasibility of said compared output representations and computing new values of the formation parameters represented by said output representations if said compared output representations are not feasible.

26. A method of machine processing well logging data derived from exploring devices which investigate earth formations traversed by a borehole, comprising:

deriving first porosity measurements functionally related to formation hydrogen content along a section of a borehole traversing earth formations;

deriving second porosity measurements functionally related to formation bulk density along a section of a borehole;

deriving third porosity measurements functionally related to the acoustic travel time of a formation along a section of a borehole;

combining said first, second, and third measurements to produce output representations of one of formation clay content or formation gas saturation along a section of a borehole;

deriving fourth measurements of one or more of the spontaneous, naturally occurring potential of a formation, the natural radioactivity of a formation, or the diameter of a borehole along a section of a borehole;

detecting if said fourth measurements exceed a given limit; and inhibiting the combination of said first, second and third measurements in response to said fourth measurements exceeding said given limit.

27. A method of machine processing well logging data derived from exploring devices which investigate earth formations traversed by a borehole, comprising:

deriving first porosity measurements functionally related to formation hydrogen content along a section of a borehole traversing earth formations;

deriving second porosity measurements functionally related to formation bulk density along a section of a borehole;

deriving third porosity measurements functionally related to the acoustic travel time of a formation along a section of a borehole;

combining said first, second, and third measurements to produce indications of one of formation clay content or formation gas saturation along a section of a borehole;

deriving fourth measurements of the spontaneous, naturally occurring potential of a formation along a section of a borehole;

deriving fifth measurements of the electrical resistivity of a formation along a section of a borehole;

detecting if a fourth measurement exceeds a first limit;

detecting if a fifth measurement exceeds a second limit; and inhibiting the combination of said first, second and third measurements in response to a fourth measurement exceeding said first limit unless a fifth measurement exceeds said second limit.

28. A method of machine processing well logging data derived from exploring devices which investigate earth formations traversed by a borehole, comprising:

deriving first porosity measurements $\phi_N$ functionally related to formation hydrogen content along a section of a borehole traversing earth formations;

deriving second porosity measurements $\phi_D$ functionally related to formation bulk density along a section of a borehole;

deriving third porosity measurements $\phi_S$ functionally related to the acoustic travel time of a formation along a section of a borehole; and combining said first, second, and third measurements to produce indications of one or more of formation clay content $q$, formation hydrocarbon saturation $S_{hy}$, total formation porosity $\phi_z$, or effective, nonclay filled formation porosity $\phi_e$ along a section of a borehole, said measurements being combined in accordance with the following:

$$\phi_N = f(\phi_e, q\phi_z, \phi_e S_{hy})$$
$$\phi_D = f(\phi_e, \phi_e S_{hy})$$
$$\phi_S = f(\phi_e, q\phi_z, \phi S_{hy})$$

where $f$ signifies a functional relationship.

29. The method of claim 28 wherein the step of combining measurements includes combining said measurements in accordance with the following:

$$\phi_N = \phi_e + q\phi_z - a\phi_e S_{hy}$$
$$\phi_D = \phi_e + b\phi_e S_{hy}$$
$$\phi_S = \phi_e + q\phi_z + c\phi_e S_{hy}$$

where $a$, $b$ and $c$ are predetermined constants.

30. The method of claim 28 wherein said hydrocarbon saturation is invaded zone gas saturation and the step of combining measurements includes combining said measurements in accordance with the following:

$$\phi_N = \phi_e + q\phi_z - N\phi_e S_{gxo}$$
$$\phi_D = \phi_e + b\phi_e S_{gxo}$$
$$\phi_S = \phi_e + q\phi_z + c\phi_e S_{gxo}$$

where $N$, $b$ and $c$ are predetermined constants.

31. A method of machine processing well logging data derived from exploring devices which investigate earth formations traversed by a borehole, comprising:

deriving first porosity measurements $\phi_N$ functionally related to formation hydrogen content along a section of a borehole traversed by earth formations;

deriving second porosity measurements $\phi_D$ functionally related to formation bulk density along a section of a borehole;

deriving third porosity measurements $\phi_s$ functionally related to the acoustic travel time of a formation along a section of a borehole; and combining said first, second, and third measurements to produce indications of formation clay content $q$, formation gas saturation $S_{gxo}$, total formation porosity $\phi_t$, and effective nonclay filled formation porosity $\phi_e$ along a section of a borehole in accordance with the relationships:

$$\phi_N = \phi_e + q\phi_t + (C_p - 1)\phi_e S_{gxo},$$
$$\phi_D = \phi_e + 0.5\phi_e S_{gxo}, \text{ and}$$
$$\phi_s = \phi_e + q\phi_t + (C_p -)\phi)\phi_e S_{gxo},$$

where the formation compaction factor $C_p$ is a known quantity.

32. A method of machine processing well logging data derived from exploring devices which investigate earth formations traversed by a borehole, comprising:
deriving first porosity measurements functionally related to formation hydrogen content along a section of a borehole traversing earth formations;
deriving second porosity measurements functionally related to formation bulk density along a section of a borehole;
deriving third porosity measurements functionally related to the acoustic travel time of a formation along a section of a borehole;
combining said first, second, and third measurements to produce indications of formation clay content, formation gas saturation, total formation porosity, and effective, nonclay filled formation porosity along a section of a borehole, each of said produced indications being functionally related to said first, second and third derived measurements;
deriving fourth measurements representative of the electrical resistivity of a formation along a section of a borehole;
combining said fourth measurements with said clay content and total and effective porosity indications to produce an indication of the percentage of water of the formation bulk volume along a section of a borehole; and
recording said bulk volume water and total and effective porosity indications on one track of a record medium to produce logs thereof whereby the separation between said total and effective porosity logs is indicative of the bulk volume clay content along a section of a borehole and the separation between the effective porosity and bulk volume water logs is indicative of the bulk volume hydrocarbon content along a section of a borehole.

33. A method of machine processing well logging data derived from exploring devices which investigate earth formations traversed by a borehole, comprising:
deriving a first porosity measurement functionally related to formation hydrogen content at a selected borehole depth level;
deriving a second porosity measurement functionally related to formation bulk density at the selected depth level;
deriving a third measurement representative of the acoustic travel time of a formation at the selected depth level;
providing an indication of a formation compaction factor which is representative of the compactness of a formation at the selected depth level;
combining said third measurement with said compaction factor indication to produce an indication of acoustic travel time derived porosity at the selected depth level;
combining said first, second, and third measurements to produce an indication of a formation characteristic at the selected depth level;
testing said formation characteristic indication to determine if said characteristic indication is within a given limit; and
adjusting said compaction factor indication if said formation characteristic indication is outside of said given limit and recombining said adjusted compaction factor indication with said third measurement to produce a new acoustic travel time derived porosity indication for recombination with said first and second measurements to produce a new indication of said formation characteristic at the selected depth level.

34. A method of machine processing well logging data derived from exploring devices which investigate earth formations traversed by a borehole, comprising:
deriving a first porosity measurement functionally related to formation hydrogen content at a selected borehole depth level;
deriving a second porosity measurement functionally related to formation bulk density at the selected depth level;
deriving a third measurement representative of the acoustic travel time of a formation at the selected depth level;
providing indications of a formation compaction factor which is representative of the compactness of a formation and the acoustic travel time of a formation matrix at the selected depth level, said indications being previously ascertained from said first and second measurements obtained at various selected borehole depth levels;
combining said indications with said third measurement to produce an indication of acoustic travel time derived porosity at the selected depth level;
combining said first and second measurements with said travel time derived porosity and compaction factor indications to produce an indication of formation clay content at the selected depth level;
testing said clay content indication to determine if said clay content indication is within a given limit;
adjusting one of said compaction factor or matrix travel time indications if said clay content indication is outside of said given limit, said compaction factor indication being adjusted until reaching a given limit and thereafter adjusting said matrix travel time indication; and
recombining said adjusted compaction factor and matrix travel time indications, if adjusted, with said measured travel time to produce a new travel time derived porosity indication for recombination with said first and second measurements to produce a new indication of clay content at the selected depth level.

35. A method of machine processing well logging data derived from exploring devices which investigate earth formations traversed by a borehole, comprising:
deriving a first porosity measurement functionally related to formation hydrogen content at a selected borehole depth level;
deriving a second porosity measurement functionally related to formation bulk density at the selected depth level;
deriving a third porosity measurement functionally related to the acoustic travel time of a formation at the selected depth level;
combining said first, second, and third measurements to produce indications of formation gas saturation in a formation zone near a borehole, formation clay content, total formation porosity, and effective, nonclay filled formation porosity at the selected depth level, each of said gas saturation, clay content, and effective and total porosity indications being functionally related to said derived porosity measurements;
deriving a fourth measurement of the electrical resistivity of a formation zone radially spaced from a borehole at the selected depth level;
combining said fourth measurement with said indications of formation clay content and total porosity to produce an indication of hydrocarbon saturation in said zone radially spaced from a borehole at the selected depth level; and
recording said gas and hydrocarbon saturation indications on a record medium to produce logs thereof whereby a comparison of said recorded logs will enable a determination of the relative oil and gas content of a formation.

36. A method of machine processing well logging data derived from exploring devices which investigate earth formations traversed by a borehole, comprising:
deriving a first porosity measurement functionally related to formation hydrogen content at a selected borehole depth level;

deriving a second porosity measurement functionally related to formation bulk density at the selected depth level;

deriving a third measurement representative of the acoustic travel time of a formation at the selected depth level;

providing an indication of a formation compaction factor which is representative of the compactness of a formation at the selected depth level, and an indication of the acoustic travel time of a formation matrix at the selected depth level;

combining said third measurement with said formation compaction factor and matrix travel time indications to produce an indication of acoustic travel time derived porosity at the selected depth level;

combining said first and second measurements with said travel time derived porosity and compaction factor indications to produce indications of formation gas saturation in a formation zone near a borehole, formation clay content, and total formation porosity at the selected depth level, each of said gas saturation, clay content, and total porosity indications being functionally related to said first and second measurements and travel time derived porosity and compaction factor indications;

deriving a fourth measurement of the electrical resistivity of a formation zone radially spaced from a borehole at the selected depth level;

combining said fourth measurement with said indications of formation clay content and total porosity to produce an indication of hydrocarbon saturation in said zone radially spaced from a borehole at the selected depth level;

comparing said gas and hydrocarbon saturation indications to determine if said gas saturation indication is greater than a given percentage of said hydrocarbon saturation indication;

adjusting one of said compaction factor or matrix travel time indications if said gas saturation indication is greater than said given percentage and recombining said third measurement with said compaction factor and matrix travel time indications to produce a new travel time derived porosity indication for recombination with said first, second, and fourth measurements to produce new indications of gas and hydrocarbon saturation at the selected depth level; and recording said new gas and hydrocarbon saturation indications on a record medium to produce logs thereof whereby a comparison of said recorded logs will enable a determination of the relative oil and gas content of a formation.

37. A method of machine processing well logging data derived from exploring devices which investigate earth formations traversed by a borehole, comprising:

deriving a first porosity measurement functionally related to formation hydrogen content at a selected borehole depth level;

deriving a second porosity measurement functionally related to formation bulk density at the selected depth level;

deriving a third measurement representative of the acoustic travel time of a formation at the selected depth level;

providing an indication of a formation compaction factor which is representative of the compactness of a formation at the selected depth level, and an indication of the acoustic travel time of a formation rock matrix at the selected depth level;

combining said third measurement with said formation compaction factor and matrix travel time indications to produce an indication of acoustic travel time derived porosity at the selected depth level;

combining said first and second measurements with said travel time deriving porosity and compaction factor indications to produce indications of formation gas saturation in a formation zone near a borehole, formation clay content, and total formation porosity at the selected depth level, each of said gas saturation, clay content, and total porosity indications being functionally related to said first and second measurements and travel time derived porosity and compaction factor indications;

deriving a fourth measurement of the electrical resistivity of a formation zone radially spaced from a borehole at the selected depth level;

combining said fourth measurement with said indications of formation clay content and total porosity to produce an indication of hydrocarbon saturation in said zone radially spaced from a borehole at the selected depth level;

testing said gas saturation indication to determine if said gas saturation indication is within a given limit;

adjusting one of said compaction factor or matrix travel time indications if said gas saturation indication is outside of said given limit and recombining said third measurement with said compaction factor and matrix travel time indication to produce a new travel time derived porosity indication for recombination with said first, second, and fourth measurements to produce new indications of gas and hydrocarbon saturation at the selected depth level; and recording said new gas and hydrocarbon saturation indications on a record medium to produce logs thereof whereby a comparison of the recorded logs will enable a determination of the relative oil and gas content of a formation.

38. A method of machine processing well logging data derived from exploring devices which investigate earth formations traversed by a borehole, comprising:

deriving a first porosity measurement functionally related to formation hydrogen content at a selected borehole depth level;

deriving a second porosity measurement functionally related to formation bulk density at the selected depth level;

deriving a third porosity measurement functionally related to the acoustic travel time of a formation at the selected depth level;

combining said first, second, and third measurements to produce indications of formation gas saturation in a formation zone near a borehole, formation clay content, total formation porosity, and effective, nonclay filled formation porosity at the selected depth level, each of said gas saturation, clay content and total and effective porosity indications being functionally related to said first, second and third measurements;

deriving a fourth measurement of the electrical resistivity of a formation zone radially spaced from a borehole at the selected depth level;

combining said fourth measurement with said indications of formation clay content and total and effective porosity to produce indications of that portion of the bulk volume of a formation filled with water and the hydrocarbon saturation in said zone radially spaced from a borehole at the selected depth level, each of said water and hydrocarbon saturation indications being functionally related to said fourth measurement and clay content, total and effective porosity indications; and recording said gas and hydrocarbon saturation indications on one track of a record medium to produce logs thereof whereby a comparison of said recorded logs will enable a determination of the relative oil and gas content of a formation, and recording said indications of bulk volume water and total and effective porosity on another track of said record medium to produce logs thereof whereby the separation between said total and effective porosity logs is indicative of the bulk volume clay content of a formation and the separation between said effective porosity and bulk volume water logs is indicative of the hydrocarbon saturation of a formation.

39. A method of machine processing well logging data derived from exploring devices which investigate earth formations traversed by a borehole, comprising:

deriving a first porosity measurement functionally related to formation hydrogen content at a selected borehole depth level;

deriving a second porosity measurement functionally related to formation bulk density at the selected depth level;

deriving a third measurement representative of the acoustic travel time of a formation at the selected depth level;

providing indications of a formation compaction factor which is representative of the compactness of a formation at the selected depth level and the acoustic travel time of a formation matrix at the selected depth level, said indications being previously ascertained from said first and second measurements obtained at various selected borehole depth levels;

combining said indications with said third measurement to produce an indication of acoustic travel time derived porosity at the selected depth level;

combining said first and second measurements with said travel time derived porosity and compaction factor indications to produce indications of formation clay content and gas saturation at the selected depth level, each of said clay content and gas saturation indications being functionally related to said first and second measurements and said travel time derived porosity and compaction factor indications;

testing said clay content and gas saturation indications to determine if said clay content and gas saturation indications are within given limits;

adjusting one of said compaction factor or matrix travel time indications if either of said clay content or gas saturation indications are outside of said given limit, said compaction factor indication being adjusted until reaching a given limit and thereafter adjusting said matrix travel time indication; and recombining said adjusted compaction factor and matrix travel time indications with said measured travel time to produce a new travel time derived porosity indication for recombination with said first and second measurements to produce new indications of clay content and gas saturation at the selected depth level.

40. A method of machine processing well logging data derived from exploring devices which investigate earth formations traversed by a borehole, comprising:

deriving a first porosity measurement functionally related to formation hydrogen content at a selected borehole depth level;

deriving a second porosity measurement functionally related to formation bulk density at the selected depth level;

deriving a third measurement representative of the acoustic travel time of a formation at the selected depth level;

providing indications of a formation compaction factor which is representative of the compactness of a formation at the selected depth level and the acoustic travel time of a formation matrix at the selected depth level, said indications being previously ascertained from said first and second measurements obtained at various selected borehole depth levels;

combining said indications with said third measurement to produce an indication of acoustic travel time derived porosity at the selected depth level;

combining said first and second measurements with said travel time derived porosity and compaction factor indications to produce indications of formation clay content and gas saturation at the selected depth level, each of said clay content and gas saturation indications being functionally related to said first and second measurements and said travel time derived porosity and compaction factor indications;

testing said clay content indication to determine if said clay content indication is within a given limit;

adjusting one of said compaction factor or matrix travel time indications if said clay content indication is outside of said given limit, said compaction factor indication being adjusted until reaching a given limit and thereafter adjusting said matrix travel time indication;

recombining said adjusted compaction factor and matrix travel time indications, if adjusted, with said measured travel time to produce a new travel time derived porosity indication for recombination with said first and second measurements to produce new indications of clay content and gas saturation at the selected depth level;

testing said gas saturation indication to determine if said gas saturation indication is within a given limit;

adjusting one of said compaction factor or matrix travel indications if said gas saturation indication is outside of said given limit unless said last named adjustment will cause said new clay content indication to be outside of its given limit; and recombining said adjusted compaction factor and matrix travel time indications with said measured travel time to produce a new travel time derived porosity indication for recombination with said first and second measurements to produce new clay content and gas saturation at the selected depth level.

41. A method of processing well logging data derived from exploring devices which investigate earth formations traversed by a borehole, comprising:

deriving first measurements functionally related to formation hydrogen content along a section of a borehole traversing earth formations;

deriving second measurements functionally related to formation bulk density along the section of a borehole;

deriving third measurements functionally related to one of the naturally occurring electrical potential or radioactivity of a formation and using said third measurements to determine the relative amount of clay in a formation to produce a representation of such clay content;

combining said first and second measurements to produce values of formation clay content along the borehole section; and utilizing said clay content representation derived from said third measurement to inhibit the combination of said first and second measurements if said third measurement exceeds a given limit.

42. A method of machine processing well logging data derived from exploring devices which investigate earth formations traversed by a borehole, comprising:

deriving first porosity measurements functionally related to formation hydrogen content along a section of a borehole traversing earth formations;

deriving second measurements functionally related to formation bulk density along the section of a borehole;

deriving third measurements functionally related to the resistivity of the noninvaded zone of the formation over the borehole section;

combining said first, second and third derived measurements to compute output representations functionally related to one or more of the shale or clay content, porosity, invaded zone water or gas saturation, or noninvaded zone water or hydrocarbon saturation;

comparing one or more of said output representations with each other or predetermined limit values to determine feasibility of said compared output representations and computing one or more of said parameters given by said output representations if said compared output representations are not feasible.

43. The method of claim 42 wherein said step of comparing and computing includes the steps of comparing said output representations related to invaded zone gas saturation and noninvaded zone hydrocarbon saturation with each other to determine feasibility, and computing new values for the parameters given by one or more of said output representations if said compared output representations are not feasible.

44. The method of claim 42 wherein said step of comparing and computing includes the steps of comparing said output representations related to invaded zone gas saturation and noninvaded zone hydrocarbon saturation with each other and comparing said output representations related to shale or clay content and invaded zone water saturation with predetermined limit values to determine feasibility, and computing new values for the parameters given by one or more of said output representations if said compared output representations are not feasible.

* * * * *

UNITED STATES PATENT OFFICE
CERTIFICATE OF CORRECTION

Patent No. 3,638,484               Dated February 1, 1972

Inventor(s) Maurice P. Tixier

It is certified that error appears in the above-identified patent and that said Letters Patent are hereby corrected as shown below:

IN THE SPECIFICATION

Column 4, line 41, equation 1, after "/" "$\rho_B - \rho_F$" should read --$\rho_G - \rho_F$--;

Column 5, line 29, "sane" should read --sand--;

Column 7, line 23, "(1-w)" should read --$(1-S_W)$--;

lines 41 & 44, "$\Delta_S$" should read --$\phi_S$--;

Column 10, line 20, "$\Delta_S$" should read --$\phi_S$--;

Column 11, line 13, "river" should read --driver--;

line 64, "$0.62/\phi_{zaq}2.15$" should read --$0.62/\phi_z^{2.15}$--;

Column 12, line 61, "$S_{gxo} < 0.7$" should read --$S_{gxo} > 0.7$--;

Column 17, line 44, "(1-bhw)" should read --$(1-S_W)$--;

IN THE CLAIMS

Column 19, Claim 3, line 60, "ore" should read --or--;

Column 29, Claim 31, line 11, "$\phi_S = \phi_e + q\phi_z + (C_p -)\phi)\phi_e S_{gxo}$"

should read --$\phi_S = \phi_e + q\phi_z + (C_p - 1)\phi_e S_{gxo}$--.

Signed and sealed this 25th day of December 1973.

(SEAL)
Attest:

EDWARD M. FLETCHER, JR.
Attesting Officer

RENE D. TEGTMEYER
Acting Commissioner of Patents